US008682728B2

(12) United States Patent
Konkol et al.

(10) Patent No.: US 8,682,728 B2
(45) Date of Patent: Mar. 25, 2014

(54) NETWORK ADVERTISING METHODS AND APPARATUS

(76) Inventors: Vincent Konkol, Fort Lauderdale, FL (US); Judd Lasarow, Fort Lauderdale, FL (US)

( * ) Notice: Subject to any disclaimer, the term of this patent is extended or adjusted under 35 U.S.C. 154(b) by 267 days.

(21) Appl. No.: 12/692,336

(22) Filed: Jan. 22, 2010

(65) Prior Publication Data

US 2011/0184814 A1 Jul. 28, 2011

(51) Int. Cl.
*G06Q 30/00* (2012.01)
(52) U.S. Cl.
USPC .................................. 705/14.69; 705/14.72
(58) Field of Classification Search
USPC ............................................................ 705/14
See application file for complete search history.

(56) References Cited

U.S. PATENT DOCUMENTS

| | | | |
|---|---|---|---|
| 5,835,712 A | | 11/1998 | DuFresne |
| 6,535,889 B1 | | 3/2003 | Headrick et al. |
| 6,763,334 B1 * | | 7/2004 | Matsumoto et al. ....... 705/14.19 |
| 7,529,797 B2 | | 5/2009 | Tseng et al. |
| 7,593,965 B2 | | 9/2009 | Gabriel |
| 7,669,123 B2 * | | 2/2010 | Zuckerberg et al. .......... 715/273 |
| 7,945,653 B2 * | | 5/2011 | Zuckerberg et al. .......... 709/223 |
| 8,136,028 B1 * | | 3/2012 | Loeb et al. ..................... 715/205 |
| 2002/0077930 A1 * | | 6/2002 | Trubey et al. ................... 705/26 |
| 2004/0111319 A1 * | | 6/2004 | Matsumoto et al. ............ 705/14 |
| 2005/0015370 A1 | | 1/2005 | Stavely et al. |
| 2007/0150537 A1 | | 6/2007 | Graham |
| 2007/0250901 A1 * | | 10/2007 | McIntire et al. .............. 725/146 |
| 2007/0265923 A1 * | | 11/2007 | Krassner et al. ................ 705/14 |
| 2008/0141110 A1 | | 6/2008 | Gura |
| 2008/0163379 A1 * | | 7/2008 | Robinson et al. .............. 726/27 |
| 2008/0243613 A1 | | 10/2008 | Silvestri et al. |
| 2008/0253739 A1 * | | 10/2008 | Livesey ........................... 386/95 |
| 2009/0006191 A1 * | | 1/2009 | Arankalle et al. .............. 705/14 |
| 2009/0006208 A1 | | 1/2009 | Grewal et al. |
| 2009/0028434 A1 | | 1/2009 | Vanhoucke et al. |
| 2009/0030774 A1 * | | 1/2009 | Rothschild et al. ............. 705/10 |

(Continued)

OTHER PUBLICATIONS

On-line article, "Goodbye, Marketing. Hello, Trustcasting", vol. 1, Issue 6, Dec. 2009, 3 pgs., published by www.famefoundry.com, http://www.famefoundry.com/1356/trustcasting/, date accessed: Jan. 15, 2010.

(Continued)

*Primary Examiner* — John G Weiss
*Assistant Examiner* — Eric Netzloff
(74) *Attorney, Agent, or Firm* — Oliff PLC

(57) ABSTRACT

A network advertising system and method includes an item within electronic media being tagged by a secondary advertiser. A text block unit receives a search query from the secondary advertiser, retrieves primary advertiser information from the primary advertiser database in response to the search query and displays the primary advertiser information to the secondary advertiser, receives the secondary advertiser's selection of the primary advertiser information, and associates the tagged item with advertising content of the primary advertiser in response to the selection of the primary advertiser information. Revenue may be shared based on recorded secondary advertising events, the secondary advertising events including one or more of (i) an indication that a potential customer has viewed the advertising content, (ii) an indication that the primary advertiser information has been displayed as a search result to the secondary advertiser, (iii) an indication that a potential customer has completed a purchase of a product based on the advertising content and (iv) an indication that the secondary advertiser has associated or maintained the association of an item with the advertising content.

24 Claims, 16 Drawing Sheets

(56) References Cited

U.S. PATENT DOCUMENTS

| | | | |
|---|---|---|---|
| 2009/0043654 A1* | 2/2009 | Bates | 705/14 |
| 2009/0063227 A1* | 3/2009 | Choi et al. | 705/7 |
| 2009/0099853 A1 | 4/2009 | Lemelson | |
| 2009/0144124 A1 | 6/2009 | Surendran et al. | |
| 2009/0150222 A1 | 6/2009 | Polonsky | |
| 2009/0164301 A1 | 6/2009 | O'Sullivan et al. | |
| 2009/0171783 A1 | 7/2009 | Raju | |
| 2009/0222432 A1 | 9/2009 | Ratnakar | |
| 2009/0276805 A1 | 11/2009 | Andrews, II et al. | |
| 2009/0317019 A1* | 12/2009 | Puliur | 382/294 |
| 2010/0023405 A1* | 1/2010 | Liu | 705/14.66 |
| 2010/0324990 A1* | 12/2010 | D'Angelo et al. | 705/14.46 |
| 2011/0035275 A1* | 2/2011 | Frankel et al. | 705/14.45 |
| 2011/0047013 A1* | 2/2011 | McKenzie, III | 705/14.4 |

OTHER PUBLICATIONS

BNET Briefing, "What is Crowdsourcing?", Jennifer Alsever, published by www.bnet.com, 3 pgs., http://www.bnet.com/2403-13241_23-52961.html, date accessed: Jan. 15, 2010.

On-line source, "All About Hoplinks", published by www.clickbank.com, 4 pgs., http://74.125.47.132/search?q-cache:dBGq6yJkHlwJ:www.clickbank.com/help/affiliate-help/affiliate-basics/all-about-hoplinks/+how+does+clickbank+track&cd=1&hl—en&ct=clnk&gl=us, date accessed: Jan. 15, 2010.

* cited by examiner

Photos of You
Back to Profile

Click on products/services that you wish to tag.    Done Tagging — 170

Type any name or tag:
□ AUTO-SELECT PPC — 190
□ AUTO-SELECT AFFILIATE — 200

Search

Step Guide / Description
Type in a word that best describes the item in the picture you put a bullseye on.

— 210

Find the exact URL address for the tagged product(s) / service(s). — 220

Find   Done   Cancel

MANSION 2009
In this photo:      Macy Lynn, Christine Yan, Jane Doe    (photos | remove tag)
Adverts In This Photo:     Jimmy Choo, BeBe Photo added by: Christine Yan

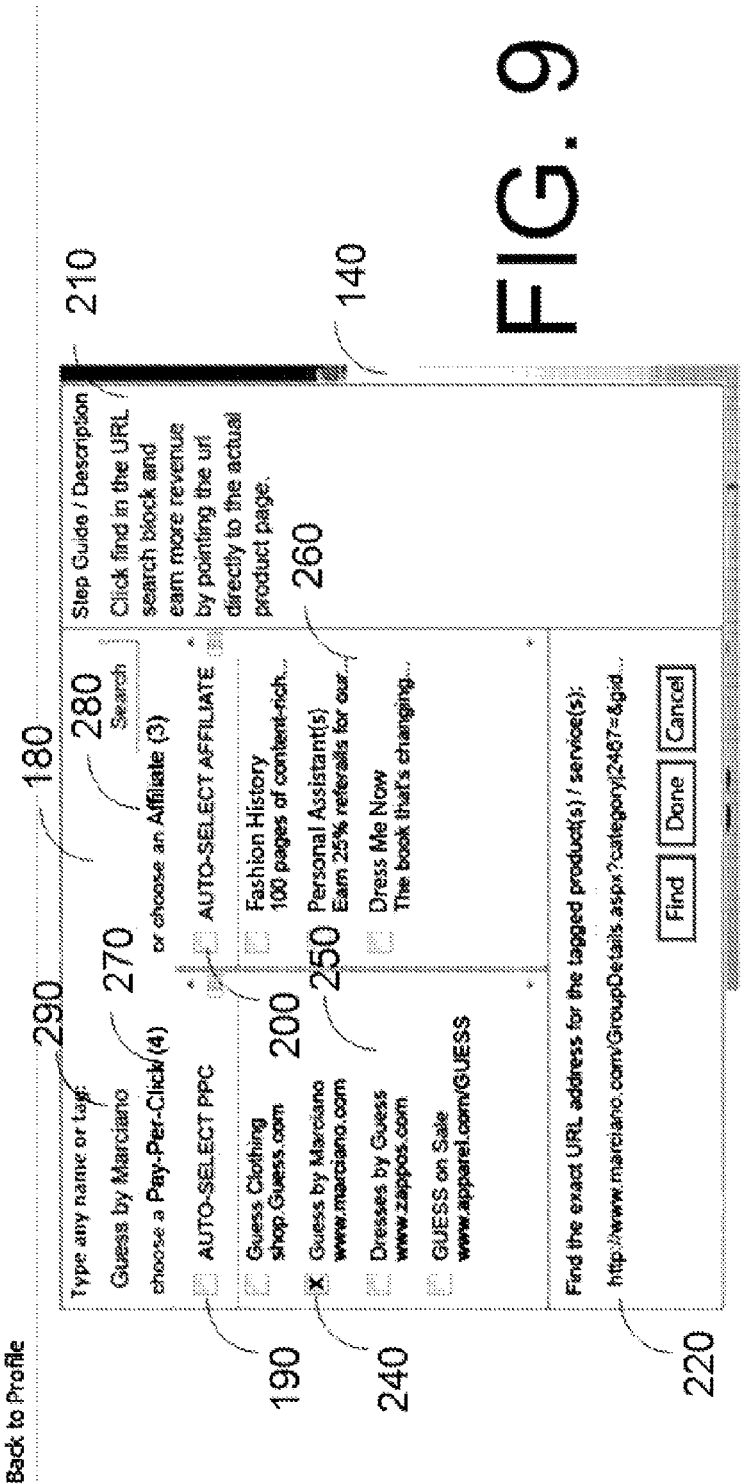

FIG. 11

NETWORK ADVERTISING METHODS AND APPARATUS

BACKGROUND

This disclosure relates to a network advertising system and method for relating embedded advertisements to electronic media.

Internet advertising has been developing rapidly since the founding of the World Wide Web and has taken many forms. Examples of internet advertisements include but are not limited to pop-up advertisements, sponsored search results, banner advertisements and commercials shown before, during, and after video. Which advertisements are shown can be random, based on keywords entered into a search box and/or based on how much advertisers are willing to bid for each keyword.

The total number of images and videos currently online is unknown and to put this figure into an exact, quantifiable amount is practically impossible. Social networking websites such as Facebook™ and image storing websites like Google™ Picasa™ are storing some of these images. Similarly, video websites like YouTube store videos that Internet users can view.

U.S. Pat. No. 7,593,965 to Gabriel discloses a system for associating advertisements with internet content, such as text, images and videos.

SUMMARY

Disclosed herein are systems and methods whereby Internet users can become secondary advertisers by embedding advertising content into their electronic media such as images and videos. The advertising content advertises products and services marketed by primary advertisers. The system and methods create a market based on relationships between Internet users and secondary advertisers for non-intrusive secondary advertising that did not previously exist. The foundation of this market is a new form of marketing based on the relationships between users and their contacts. The marketing form incorporates recent marketing trends in crowdsourcing and trustcasting.

Disclosed herein is a network advertising system that includes a primary advertiser database, a tagging unit, a text block unit, a revenue-generating transaction database, and an accounting unit. The primary advertiser database stores a list of primary advertisers willing to pay a secondary advertiser to embed advertising content into electronic media and make the electronic media with the embedded advertising content viewable by potential customers in a manner that allows the potential customers to be exposed to an advertisement. "Exposed to an advertisement," as used herein, includes potential customers viewing or being impressed by the advertisement. The tagging unit allows a secondary advertiser to tag an item within the electronic media. The text block unit receives a search query from the secondary advertiser, retrieves primary advertiser information from the primary advertiser database in response to the search query and displays the primary advertiser information to the secondary advertiser, receives the secondary advertiser's selection of the primary advertiser information, and associates the tagged item with advertising content of the primary advertiser in response to the selection of the primary advertiser information. The revenue-generating transaction database records secondary advertising events for which the primary advertiser is willing to pay, the secondary advertising events including one or more of (i) an indication that a potential customer has been exposed to the advertising content, (ii) an indication that the primary advertiser information has been displayed as a search result to the secondary advertiser, (iii) an indication that a potential customer has completed a purchase of a product based on the advertising content and (iv) an indication that a secondary advertiser has associated or maintained an association of the item with advertising content. The accounting unit tracks what is owed by the primary advertiser based on the transactions recorded by the revenue-generating transaction database.

Also disclosed herein is network advertising method including the steps of: maintaining a primary advertiser database that stores a list of primary advertisers willing to pay secondary advertisers to embed advertising content into electronic media and make the electronic media with the embedded advertising content viewable by potential customers in a manner that allows the potential customers to be exposed to an advertisement; receiving an indication that the secondary advertiser has tagged an item within the electronic media; receiving a search query from the secondary advertiser, retrieving primary advertiser information from the primary advertiser database in response to the search query and displaying the primary advertiser information to the secondary advertiser, receiving the secondary advertiser's selection of the primary advertiser information, and associating the tagged item with advertising content of the primary advertiser in response to the selection of the primary advertiser information; recording secondary advertising events for which the primary advertiser is willing to pay, the secondary advertising events including one or more of (i) an indication that a potential customer has been exposed to the advertising content, (ii) an indication that the primary advertiser information has been displayed as a search result to the secondary advertiser, (iii) an indication that a potential customer has completed a purchase of a product based on the advertising content and (iv) an indication that a secondary advertiser has associated or maintained an association of the item with advertising content, and tracking what is owed by the primary advertiser based on the transactions recorded by the revenue-generating transaction database.

In some embodiments, the actions permitted to a primary advertiser terminal are limited to (i) authenticating the primary advertising information, (ii) removing the primary advertising information from the electronic media or (iii) reporting the primary advertising information to a coordinating system that manages the network advertising system.

In some embodiments, a search engine toolbar is provided that receives a second search query from the secondary advertiser seeking to find a specific URL related to the tagged item. Search results are retrieved from a website and presented to the secondary advertiser until the secondary advertiser finds the specific URL, and the specific URL is returned to the text block unit and associated with the embedded advertisement.

In some embodiments, the primary advertiser information is not visible in the electronic media by the potential customer until a rollover of the tagged item by the potential customer.

In some embodiments, the secondary advertiser is an originator of the electronic media.

In some embodiments, when the primary advertiser information changes, the text block unit receives a selection from the secondary advertiser of other primary advertiser information of the primary advertiser or of a different primary advertiser.

In some embodiments, image recognition software recognizes tagged item(s) in the electronic media and searches other electronic media for a second item that is the same as the first tagged item, and the tagging unit causes the second item to be a second tagged item with the primary advertiser information of the first tagged item.

In some embodiments, the electronic media is a video, and image recognition software tracks tagged item(s) over multiple frames of the video.

In some embodiments, the network advertising system is configured to pause the video upon a rollover of the video that may cause all tagged items to display, or upon rollover of the tagged item.

In some embodiments, the text block unit is configured to prompt the secondary advertiser to change the primary advertiser information when the accounting unit determines that an account balance of the primary advertiser falls below a predetermined level.

In some embodiments, the search query is a description of the tagged item inputted by the secondary advertiser.

In some embodiments, for receiving the secondary advertiser's selection of primary advertiser information, the text block unit presents to the secondary advertiser options to (i) automatically assign the primary advertiser information from the primary advertiser database, (ii) manually assign the primary advertiser information from the primary advertiser database and (iii) manually enter the primary advertiser information that may or may not be in the primary advertiser database.

In some embodiments, an invitation to be added to the primary advertiser database is sent to a prospective primary advertiser, and if the prospective primary advertiser accepts the invitation, the prospective primary advertiser is added to the primary advertiser database.

In some embodiments, a request to review the association of the primary advertising information is sent to the primary advertiser, if the primary advertiser is in the primary advertiser database, and a reply received from the primary advertiser may authenticate the association of the primary advertising information, remove the association of the primary advertising information or report the association of the primary advertising information to a coordinating system of the network advertising system.

BRIEF DESCRIPTION OF THE DRAWINGS

Exemplary embodiments are described below with reference to the attached drawings, in which like reference numerals designate like components.

FIGS. 6-11 are exemplary screenshots that are viewable using the system depicted in FIG. 1 and/or the electronic media processing method depicted in FIGS. 2-5;

DETAILED DESCRIPTION OF EMBODIMENTS

Figure 1:
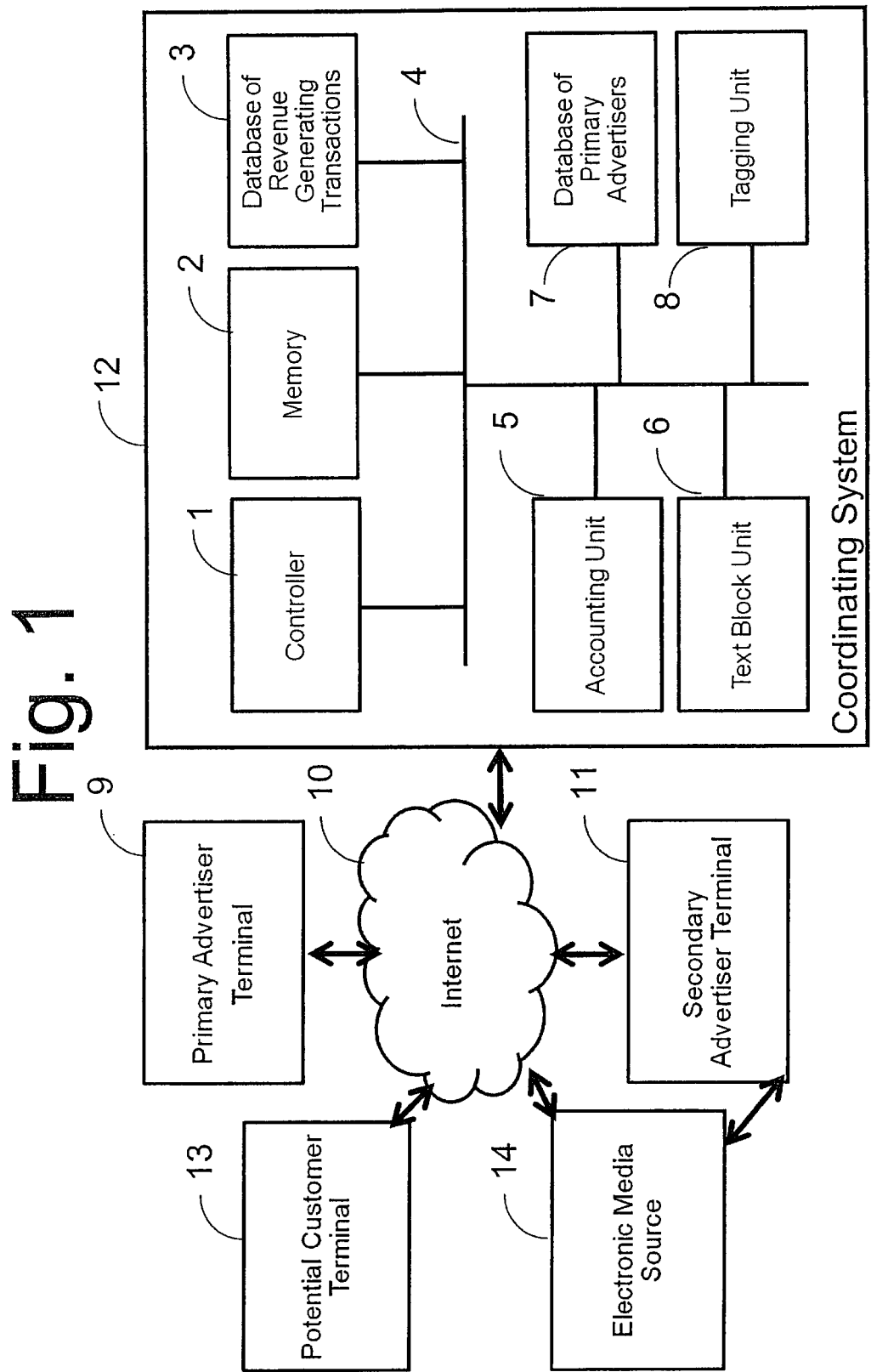
FIG. 1 is a functional block diagram depicting an exemplary embodiment of an electronic media processing system.

Disclosed herein are systems and methods whereby users can become secondary advertisers by embedding advertising content, which advertises products marketed by primary advertisers, into electronic media, such as still images or videos, that are viewable by other users. The term "product", as used herein, includes anything that can be purchased such as products, services and/or articles of manufacture. The secondary advertisers and/or one or more accounts of the coordinating system may be paid by the primary advertisers based on the embedding of the advertising content. For example, the coordinating system may be paid when a secondary advertiser advertises the primary advertiser's products in electronic media to potential customers (e.g., when potential customers are exposed to the electronic media of the secondary advertiser with the embedded content), when the potential customers purchase the primary advertiser's products, or when the primary advertiser or its advertising content appears in search results to a secondary advertiser who is seeking to advertise products. As another example, a secondary advertiser may be paid when the secondary advertiser advertises the primary advertiser's products in electronic media to potential customers (e.g., when potential customers are exposed to the electronic media of the secondary advertiser with the embedded content), or when the potential customers purchase the primary advertiser's products.

A secondary advertiser can include the originator of electronic media. "Originator" includes, but is not limited to, a creator or the uploader of electronic media or, in some cases, agents of (e.g., employees) or superiors of the creator or uploader. In the case of a couple who hires a wedding photographer for their wedding, the couple may be the originator even though the wedding photographer is technically the creator of the wedding photos because the couple hired the wedding photographer. For the purpose of this application, the term "user" excludes primary advertisers. Users can have preexisting relationships to each other. For example, in Facebook™, users can be "Friends" or "Friends of Friends." LinkedIn™ has first, second and third degree "connections" and also "group affiliations." Any user that uploads electronic media onto a social networking, photo storing or general business website may be allowed to participate as a secondary advertiser.

Primary advertisers may be any individual or business that advertises online. The advertisement charges can work at least on a Pay-Per-Click (PPC), Pay-Per-Impression (PPM), or Affiliate (AFF) basis. Advertisers can choose any or all of these options. Each option may require a separate payment by the primary advertiser to a marketing company, a website owner or a secondary advertiser.

In Pay-Per-Click (PPC), primary advertisers pay a fee each time their advertisement link or advertisement image in a secondary advertiser's electronic media is clicked on by a potential customer. This is typically a flat fee that is pre-negotiated between a coordinating system and the primary advertiser. This fee revenue may be shared by the coordinating system and the secondary advertiser. As an exemplary tracking mechanism, a URL (Uniform Resource Locator) chosen by the secondary advertiser with which to associate advertising content with the secondary advertiser's electronic media can be encoded with a special code within the URL to track events such as viewing of the content by potential customers. One example of a URL tracking method is a Clickbank™ Hoplink.

In Pay-Per-Impression (PPM), primary advertisers pay a fee when their content appears in search results shown to potential secondary advertisers who are looking for advertising content to associate with their electronic media. In this case, the fee revenue typically goes only to the coordinating system.

In the Affiliate (AFF) scenario, primary advertisers will only pay a fee if a potential customer finalizes a purchase via the advertising content that has been associated with a secondary advertiser's electronic media. In this case, an advertising agency, the coordinating system and the secondary advertiser may share the fee revenue. As with PPC campaigns, the AFF URL link(s) can be encoded with unique identifiers (e.g. the user's username) to track commissions.

The secondary advertiser can earn revenue based on Pay-Per-Click or Affiliate commission. Optionally, if agreed to by a primary advertiser and/or the coordinating system, a secondary advertiser can also earn revenue based on Pay-Per-Click with a higher commission percentage if the specific URL for the tagged advertisement is entered (compared to, for example, simply entering a link to the primary advertiser's home page). Secondary advertisers can earn Affiliate commission with established percentage(s) only if another user completes a purchase after following an established Affiliate link. The coordinating system charges the primary advertiser in one of the three ways listed above (i.e., PPC, PPM or AFF). The coordinating system may include, but is not limited to, any of the following: a Search Engine Marketing (SEM) company (e.g., Google™, Yahoo™, Bing™, etc.); an Image Storing/Hosting website (e.g., Facebook™, ImageShack™, Photobucket™, Flikr™, etc.); a Social Networking website (e.g., Facebook™, Myspace™, Bebo™, Hi5™, etc.); a Video Uploading website (YouTube™, MetaCafe™, Yahoo Video™, Google Video™, etc.); Business websites; Mobile application platforms; etc., or combinations thereof. A portion of the revenue collected from the primary advertisers can be given to the secondary advertisers and/or to accounts of the coordinating system (e.g., Facebook™).

A secondary advertiser may share his or her electronic media with his or her contacts through a coordinating system, e.g., a social networking site or an electronic media storage website. Social networking sites include, but are not limited to, Facebook™, LinkedIn™ and MySpace™. Electronic media storage websites include, but are not limited to, Facebook™, Imageshack™, Photobucket™, Flickr™, Multiply™, and Picasa™. Social networking websites and electronic media storage websites often overlap (e.g., Facebook™ functions as both a social networking website and an electronic media storage website).

FIG. 1 is a functional block diagram depicting an exemplary embodiment of an electronic media processing system. FIG. 1 depicts a coordinating system 12, a primary advertiser terminal 9, Internet 10, a secondary advertiser terminal 11, a potential customer terminal 13 and an electronic image source 14. The coordinating system 12 includes, for example, a controller 1 (such as a Central Processing Unit (CPU)), a memory 2, a database of revenue generating transactions 3, an accounting unit 5, a text block unit 6, a database of primary advertisers 7 and a tagging unit 8, which are interconnected as appropriate by a bus 4 or other type of link. The bus 4 is connected to the Internet in a common manner. The coordinating system 12 may be or include, for example, a personal computer, a server, a social networking website or an electronic media hosting website.

Various components of the coordinating system 12 may alternatively be implemented by hardware or other processing circuitry, or any combination of software, hardware and/or other processing circuitry. The coordinating system 12, the primary advertiser terminal 9, the Internet 10, the secondary advertiser terminal 11, the potential customer terminal 13 and the electronic image source 14 may be disposed locally or remotely of each other and communicate via any suitable known or later-developed communication medium (e.g., LAN, WAN, Intranet, Internet, hardwire, modem connection, wireless, etc.). The software and/or processes described above may be modified in any manner that accomplishes the functions described herein. The controller 1 controls the operation of other components of the coordinating system 12, performs any necessary calculations and executes any necessary programs for implementing the processes of coordinating system 12 and its individual components, and controls the flow of data between other components of the coordinating system 12 as needed.

Memory 2 may serve as a buffer for information coming into or going out of the coordinating system 12, may store any necessary programs and/or data for implementing the functions of the coordinating system 12, and/or may store data at various stages of processing. Further, it should be appreciated that the memory 2, while depicted as a single entity, may actually be distributed. Alterable portions of the memory 2 are, in various exemplary embodiments, implemented using RAM. However, the memory 2 may also be implemented using disk storage, optical storage, flash memory or the like. Each of the primary advertiser terminal 9, the secondary advertiser terminal 11, the potential customer terminal 13 and the electronic image source 14 may also have its own memory and controller (not depicted), as needed.

The secondary advertiser terminal 11 and the potential customer terminal 13 can be directly connected through the Internet 10, through the coordinating system, or through a social networking and/or electronic media storage website.

The database of revenue generating transactions 3 records exposures to the tagged items or the advertisements and associates this data with the appropriate accounts in the accounting unit 5. For example, one of the accounts that correspond to a primary advertiser listed in the database of primary advertisers 7 would be debited while accounts of a secondary advertiser and the coordinating system owner may be credited. The exposures include clicks, impressions (i.e., viewing events), or purchases performed through the secondary advertiser terminal 11 or the potential customer terminal 13. A cost for primary advertisers can be set at a fixed rate, e.g., $1 spent per click or per thousand impressions, as a percentage of purchase price, or as a flat-fee that can be applied one time, per month, per fiscal, or annum, respectively. The database of revenue generating transactions 3 may contain security features or retain outside security services to help ensure that a secondary advertiser cannot artificially generate revenue by, for example, creating an advertisement and then clicking on his or her own advertisement, or hiring and/or soliciting associates to do so in an effort to increase his or her revenue from the advertisement on a Pay-Per-Click basis.

The databases may be coded in any language, and managed by a person or group independent of the advertisers and/or the coordinating system. The databases may include standard database components known to those in the art such as interface drivers, structured query language (SQL) engines, transaction engines, relational engines, storage engines, language drivers and query engines.

The accounting unit 5 tracks the credits and debits for each of the revenue generating transactions, and may also contain information (such as balances, analytics and transaction histories) on each of the accounts of the primary advertisers, secondary advertisers, coordinating system and/or potential customers.

The text block unit 6 allows a secondary advertiser to associate tags with links such as a primary advertiser's URL or words and/or phrases describing the advertisement.

The tagging unit 8 applies tags to electronic media and labels the tags. A tag is a visual indicator embedded within the electronic media that signifies to the primary advertisers, secondary advertisers and potential customers that products will be associated with the tag. However, the tag can be made invisible until a potential customer performs an action, such as a rollover of the tagged item. The item includes graphics, objects in the image or areas within the image. The function of tagging unit 8 and text block unit 6 will be understood in more detail in the context of the methods discussed below. A rollover includes placing a mouse or a cursor over the tagged item. In the case of video, a rollover includes placing a mouse or a cursor over the video or a tagged item within the video.

Internet 10 is a platform through which, e.g., the primary advertiser terminal 9, the secondary advertiser terminal 11, the coordinating system 12, the potential customer terminal 13 and/or the electronic media source 14 communicate. The medium is not limited to the World Wide Web. Interface platforms across multiple protocols may include, but are not limited to: (1) internet/intranet (Transmission Control Protocol/Internet Protocol (TCP/IP)—specifically Hypertext Transfer Protocol (HTTP), File Transfer Protocol (FTP); (2) email (Internet Message Access Protocol (IMAP), Post Office Protocol (POP3), Simple Mail Transfer Protocol (SMTP); (3) cellular phone/mobile networking—specifically Multimedia Messaging Service (MMS), Short Messaging Service (SMS), Wireless Application Protocol (WAP), Wireless Fidelity (WiFi), and International Mobile Telecommunications-2000 (IMT-2000, or 3G, or 4G, or "x"G, where "x"=current version); (4) e-book device(s); (5) Bluetooth devices; (6) GPS devices; (7) mobile internet devices (MIDs); (8) holographic devices; and (9) brainwave devices. Internet 10, as used herein, can be any single or combination of the above interface platforms.

The coordinating system 12, primary advertiser terminal 9, secondary advertiser terminal 11 and potential customer terminal 13 can take many forms across the exemplary platforms listed above. In one example, some or all of these devices can be personal computers or mobile phones. However, these devices are not limited. For example, the secondary advertiser terminal 11 can be or include the electronic media source 14 (e.g., a digital camera) or an electronic device that interacts with the electronic media source 14, such as a printer, a television or a gaming console. The potential customer terminal 13 can be any device where the potential customer can be exposed to and interact with the advertisements embedded in the electronic media uploaded by the secondary advertiser and/or make a purchase. For example, the potential customer terminal 13 can be a personal computer/internet terminal, a television, an e-book device, a GPS device, a mobile phone, a mobile internet device or any other communication-capable device containing a display, online and/or offline.

Electronic media includes, but is not limited to, electronic image files and electronic video files. The term "media," as used herein, can refer to the singular "medium" or the plural "media." Electronic image files may be raster, vector or 3D formats. Electronic image files include, but are not limited to: JPEG (Joint Photographic Experts Group); ExIF (Exchangeable Image File Format); TIFF (Tagged Image File Format); RAW (Raw Image); PNG (Portable Network Graphics); GIF (Graphics Interchange Format); BMP (Windows Bitmap); PPM (Portable Pixmap); PBM (Portable Graymap); PNM (Portable Bitmap); TGA (Targa); ILBM (InterLeaved Bitmap); PCX (Personal Computer eXchange); ECW (Enhanced Compression Wavelet); CD5 (Chasys Draw Image); FITS (Flexible Image Transport System); PSD (Photoshop Data File); CGM (Computer Graphics Metafile); SVG (Scalable Vector Graphics); ODG (Open Document Graphics); EPS (Encapsulated PostScript); PDF (Portable Document Format); SWF (Shockwave Flash); WMF (Windows Metafile); EMF (Enhanced Metafile); XPS (XML Paper Specification); PNS (PNG Stereo); JPS (JPEG Stereo); and MPO (Multi-Picture Object).

Electronic video files may include, but are not limited to: 3G2 (3GPP2 Multimedia File); 3GP (3GPP Multimedia File); ASF (Advanced Systems Format File); ASX (Microsoft ASF Redirector File); AVI (Audio Video Interleave File); FLV (Flash Video File); MOV (Apple QuickTime Movie); MP4 (MPEG-4 Video File); MPG (MPEG Video File); RM (Real Media File); SWF (Flash Movie); VOB (DVD Video Object File); and WMV (Windows Media Video File).

The electronic media source 14 can be any device for creating the above types of electronic media. The electronic media source 14 includes origination sources that can create the above types of electronic media, for example, a scanner, a digital camera, a camcorder, a video camera, a computer and a microphone. Alternatively, the electronic media source 14 can be a storage medium that has electronic media on it, such as a hard drive or a DVD. The electronic media source 14 can be directly connected to the secondary advertiser terminal 11, or may be connected to the secondary advertiser terminal 11 via the Internet 10.

In an exemplary embodiment, the user uploads electronic media to a social networking site, such as Facebook™. The content in this case may be a photo or a video. Once the electronic media is uploaded, the tagging unit 8 and the text block unit 6 create a path that enables the user to attach advertising content or links (such as URLs) of relevant advertisers found within the database of primary advertisers 7 to items that are visible within the electronic media.

Using the text block unit 6, the secondary advertiser is given control over the associations with the electronic media. Once the secondary advertiser selects information relating to the primary advertiser, the coordinating system 12 extracts the primary advertiser information out of the database of primary advertisers 7 such as: the Universal Record Locator URL link, default path(s) and contact number(s). The URL link presented to the secondary advertiser's contacts (i.e., potential customers) is chosen by the user, but there may be additional information stored in the database of primary advertisers 7, such as account numbers and URL history. The text block unit 6 then attaches the advertiser's URL link and any other information it collects that is associated to the item tagged by the tagging unit 8 within the electronic media. The URL link may remain fixed on the image item or, in the case of video, follow the item through every frame for a predetermined number of frames.

The database of primary advertisers 7 lists participating advertisers and businesses. The database of primary advertisers 7 can be a centrally stored database or one distributed across multiple devices and/or platforms. For example, different types of information within the database can be stored in different locations in the same or different computer-readable storage medium.

Advertisers can open an account by submitting information to the coordinating system 12, which is then stored in the database of primary advertisers 7. The submitted information may be, e.g., a website address and a questionnaire. The information may, for example, be input on a questionnaire, which may be a generic form or may be based on the specific industry of the advertiser's business or clients. The embodiments can automatically assign words associated with the advertiser's provided information and automatic updates to the database of primary advertisers 7 that is updated on a continual basis.

A keyword word list can be placed in the database of primary advertisers 7. The coordinating system 12 backend can supply a variety of associated words for the industry of interest. The coordinating system may automatically add word and phrases to the word list(s) and the text block unit shows the most relevant results in the text block to the secondary advertiser.

However, embodiments herein provide for limited control by the primary advertisers. Primary advertisers preferably have no control over the advertisement placement or the ranking order of primary advertisers that are listed in response to a search in the pop-up text block. Primary advertisers preferably only have the ability to remove non-relevant URL links.

The limited control by the primary advertisers promotes a user-created and user-driven community. Secondary advertisers may be financially rewarded to create exact URL links and other information that is associated to the items within their electronic media content, on behalf of primary advertisers. The primary advertisers may verify linked advertisements to confirm either association(s) or relevancy, or to ensure they do not contain inappropriate or offensive content, but otherwise do not need to manage the advertisements. The primary advertisers may also reject associations based on predetermined and agreed-upon criterion.

The coordinating system 12 can manage and control access, data entry and retrieval privileges between the database of primary advertisers 7, the database of revenue generating transactions 3, the primary advertiser terminal 9, the secondary advertiser terminal 11, the potential customer terminal 13, and/or any other internally or externally located database, information storage location or device.

Although the elements of FIG. 1 are shown as belonging to separate system components, the elements of FIG. 1 can be linked in any other desired way, or distributed in any other desired configuration.

It will be understood that various ones of the units shown in FIG. 1, e.g., the accounting unit 5, the text block unit 6, the tagging unit 8, or portions of any of these, can be implemented in software in a suitably programmed general purpose computer. Alternatively, the units can be implemented as physically distinct hardware circuits within an ASIC, or using a FPGA, a PDL, a PLA or a PAL, or using discrete logic elements or discrete circuit elements. The particular form each of the units shown in FIG. 1 will take is a design choice and will be obvious and predictable to those skilled in the art.

An exemplary embodiment of the network advertising system described above will be explained using Facebook™. Once a user (a secondary advertiser) uploads an image into an album in Facebook™, the secondary advertiser may activate the application disclosed in the embodiments herein by clicking the "Tag An Advert" option. The secondary advertiser then has the option of tagging item(s) within the image to which the secondary advertiser would like to assign advertisements to. Once the secondary advertiser finds an item of interest, the secondary advertiser clicks on the item in the image. A pop-up text block will then appear. Inside of the pop-up text block are several options that display, but, in order to use these options, the secondary advertiser enters words or phrases in the field at the top of the pop-up text block that describe the item(s) being tagged in the image.

Once the secondary advertiser inserts a word or phrase, the secondary advertiser is presented with choices, such as: "Search," "Auto-select PPC (Pay-Per-Click)," "Auto-Select AFF (affiliate)," "enter in URL" and "Cancel." The auto-select options are for selecting information of primary advertisers who have agreed in advance to advertise by PPC or AFF. If the secondary advertiser clicks "Search," then an additional choice may be created by displaying text that was written by advertisers in their administrative information on their initial information submittal or questionnaire. Secondary advertisers can change the text in the block but preferably only results of paying primary advertisers will display in the pop-up text block. When the secondary advertiser checks the auto-select PPC or AFF block, the coordinating system 12 will find and insert a URL based on the words written in the item description field into the URL address bar. Alternatively, secondary advertisers can enter any URL address by typing or copying and pasting into the URL address bar. "Cancel" will close the pop-up window.

Once a URL address is inserted in the text block in the pop-up window, the secondary advertiser can choose "Find," "Done" or "Cancel."

If a secondary advertiser clicks "Find," then the URL previously inserted in the address bar will open an Internet window with two frames. In the title bar (which may be transparently integrated with the browser window), a search engine toolbar will appear with three new options: "Google™ Search," "Update Link" and "Cancel." A Google™ search engine toolbar is discussed herein as exemplary toolbar. However, it is understood that the search engine toolbar can include a search function by or a link to any other search provider such as Yahoo™ or Bing™. The Google™ search engine toolbar helps secondary advertisers quickly perform new searches of the item that they are looking for. The "Update link" and "Cancel" button both close the two-framed window, take the current website address and automatically insert the URL into the URL address bar in the pop-up text block in the previous section. Clicking "Done" will cross reference the URL in the URL address bar with the primary advertiser database. Clicking "Cancel" will close the application and return the secondary advertiser to the image or other electronic media.

Another example of the above exemplary embodiment is described below from a user's (secondary advertiser's) perspective. A user is logged into Facebook.com™ and wants to share the photos of a recent vacation the user had in Miami, Fla. In order to upload photos, an album must first be created, as is well known in the Facebook™ context. The user then names the album, creates a short description and adjusts the privacy setting(s).

The privacy setting(s) determine who can view the images in the album. The user has the option to either allow or limit the visibility of the album and its images. For example, the user can choose to allow the album to be viewable by the entire Facebook™ network, the user's network only, the user's network and friends, or the user's friends only. The user also has the option of creating a customized list of those to whom access is granted.

Once the user has uploaded all of the photos and created an album, the album and its images will be exclusively stored in the user's Facebook™ profile unless the user chooses to tag friends or share the album with others through the "Share This Album" option. In the case of the latter, the recipient(s) of this invitation must already be a current Facebook™ member or must register an account in order to view the album and its respective images.

Tagging friends will result in the image being added to the tagged person's Facebook™ profile, under the section "View Photos of Me". As used here, "tagging" friends is similar to tagging item(s) in that the secondary advertiser points to the person and indicates which of their Facebook™ friends correspond to the pointed-to person. However, if the image originator's profile is set to "inactive" or "deleted," the image will not be seen.

In this hypothetical example, the user (i.e., the image originator, who will become a secondary advertiser) opens an image in the album. The image is a photograph of the user and four of his friends standing at an intersection along Collins Avenue in South Beach, Miami. The background contains images of several well-known hotels. The user decides to advertise one of the hotels by clicking on the "Tag an Advert" option located at the bottom right-hand corner of the page.

Now that the user has activated the application, a mark, such as a small, round semi-transparent bullseye, will follow the cursor. The user moves the bullseye to the exact area of the image that the hotel is displayed and clicks on the area to tag the hotel. Alternatively, the user could have tagged areas of the images such as clouds or part of the sky.

As a result of the clicking, a pop-up text block appears on the screen. Inside of the pop-up are several options that display for the user to choose from. To use these options, however, the user is required to first enter words or phrases that describe the item that he has tagged in the image into the text block located at the top of the screen. In this example, the user types in the words "Miami Hotel" and 5 options become available to him: 1. Search, 2. Auto-Select PPC (Pay-Per-Click), 3. Auto-Select AFF (Affiliate), 4. Enter in URL, or 5. Cancel.

In this instance, the user clicks "Search" and additional choices under both the PPC (Pay-Per-Click) and AFF (Affiliate) columns are created, displaying text descriptions of participating primary advertisers' websites that have selected "Hotels" as their respective industry when becoming a part of the database of primary advertisers. By checking the "Auto-Select PPC" or "Auto-Select AFF" block, the coordinating system will automatically find and populate the URL address bar with a URL of a participating PPC or AFF primary advertiser selected from the database of primary advertisers and based on the words "Miami Hotel", (e.g., Expedia.com, Hotels.com, or Fontainebleau.com). Instead of auto-selecting a primary advertiser's website, the user decides to insert into the URL address bar the exact URL address of the Miami hotel that was shown in the uploaded picture. The user knows the name and the URL address of the homepage of the hotel.

Once the user selects or enters the URL address into the URL text block in the pop-up window, the user can either click: 1. Find, 2. Done or 3. Cancel. In this example, the user enters "http://www.fontainebleau.com" in the URL address bar and clicks "Find", which automatically navigates to the Fontainebleau Hotel's homepage. A transparent text block follows the user to this page and all page(s) thereafter. The transparent text block that contains the Google™ Search Engine Toolbar has three options available to the user: 1. Google™ Search, 2. Update Link, or 3. Cancel.

The Google™ Search bar is readily available to assist the user in finding new websites. The "Update Link" and "Cancel" buttons both close the window and auto-populate the URL of the current web page the user is viewing into the pop-up block's URL text block.

In this particular scenario, the user decides to find the exact page of relevance for the Fontainebleau Hotel and navigates to the "Room Reservations" page via the "Reservations" link on the homepage and then clicks the "Update Link" button. The user is then redirected to the pop-up text block and clicks "Done." Once the user clicks "Done", the URL is cross-referenced with the database of primary advertisers and is, in this case, verified as a primary advertiser. The system then attaches the associated advertisement's URL link and the words "Miami Hotel" to the image. The user can repeat this process or delete the tag. The number of advertised tags per image may be limited to four, for example.

The user also has the option to change the label associated with the advertisement's hyperlinked URL in the image (e.g., change "Miami Hotel" to "Fontainebleau Hotel"). By providing incentives for the users (secondary advertisers) to find the exact page of relevance, the primary advertiser may be able to close the sale faster and increase its conversion rate by decreasing the overall time spent "window shopping" on the respective website.

The above descriptions can be understood in more detail with respect to the following descriptions of FIGS. 2-5. FIGS. 2-5 depict sections of a large flow chart depicting a user (secondary advertiser) front end. Indicators are placed on the edges of the pictures with broken arrows to signify the continuation of a flow from one figure to another figure.

The flowcharts of FIGS. 2-5 depict an exemplary electronic media processing method. The flowchart illustrates the functionality of a Facebook™ example where a secondary advertiser (referred to in the discussion of this flowchart as "user" for convenience) uploads an electronic image file, tags the file and associates the file with an advertisement. In step S1010, the user uploads an electronic image file to an online album on a social networking or image storing website. In step S1020, the user selects to start tagging items by clicking on a user interface button, e.g., "Tag an Advert." In step S1030, the user clicks directly on the item or outlines an area within the electronic image file of the item that the user wishes to tag. The size of the outlined area may determine the size of the item's tag, e.g., a transparent bullseye. Alternatively, an image recognition program may recognize the selected object so the size of item's tag reflects the size of the object. Alternatively, a user or the image recognition software may outline the shape of the object such that the item tag is the outline itself or the entire item pops out of the image upon a rollover of the item.

Figure 2:
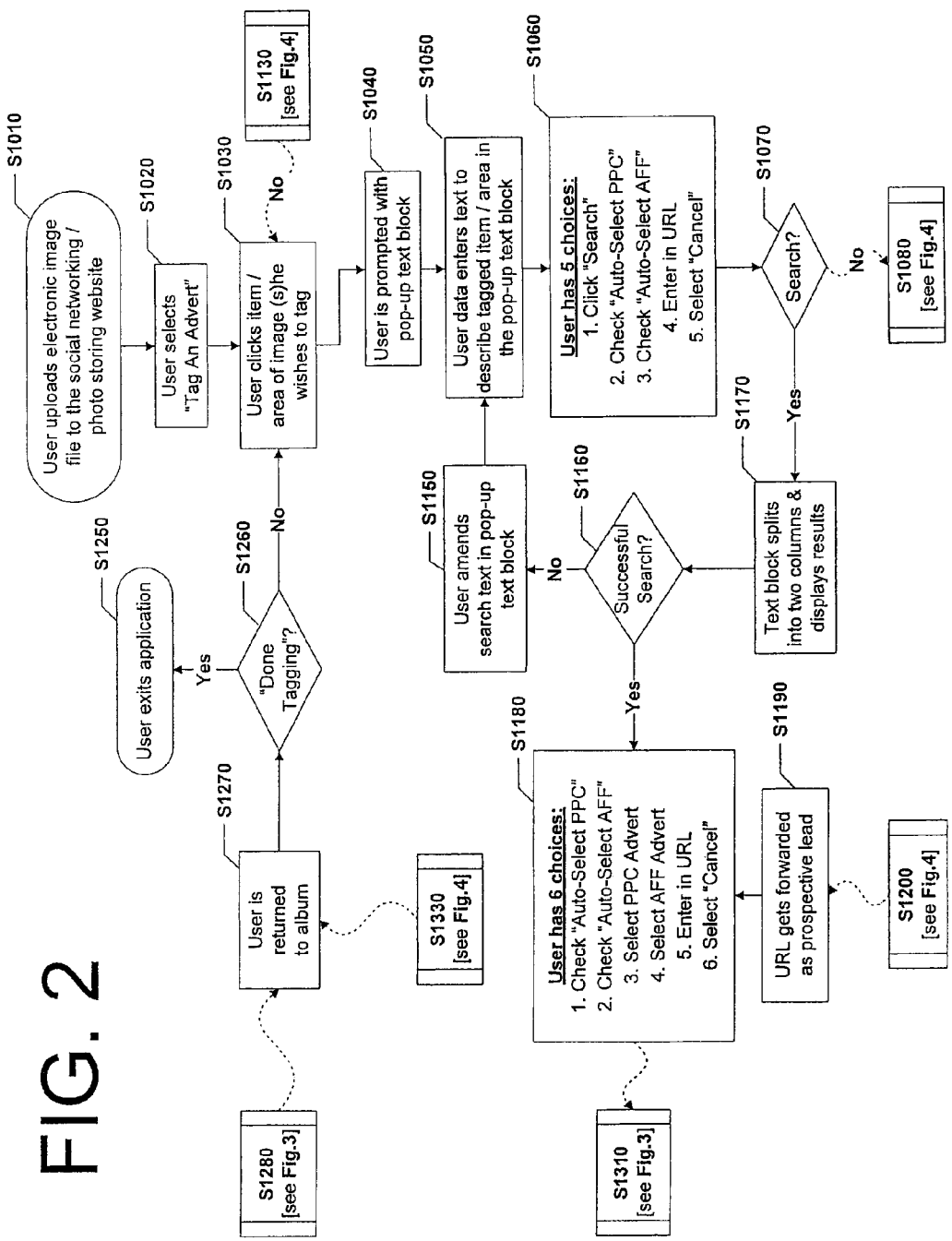
FIGS. 2-5 illustrate a flowchart depicting an exemplary electronic media processing method.
Figure 3:
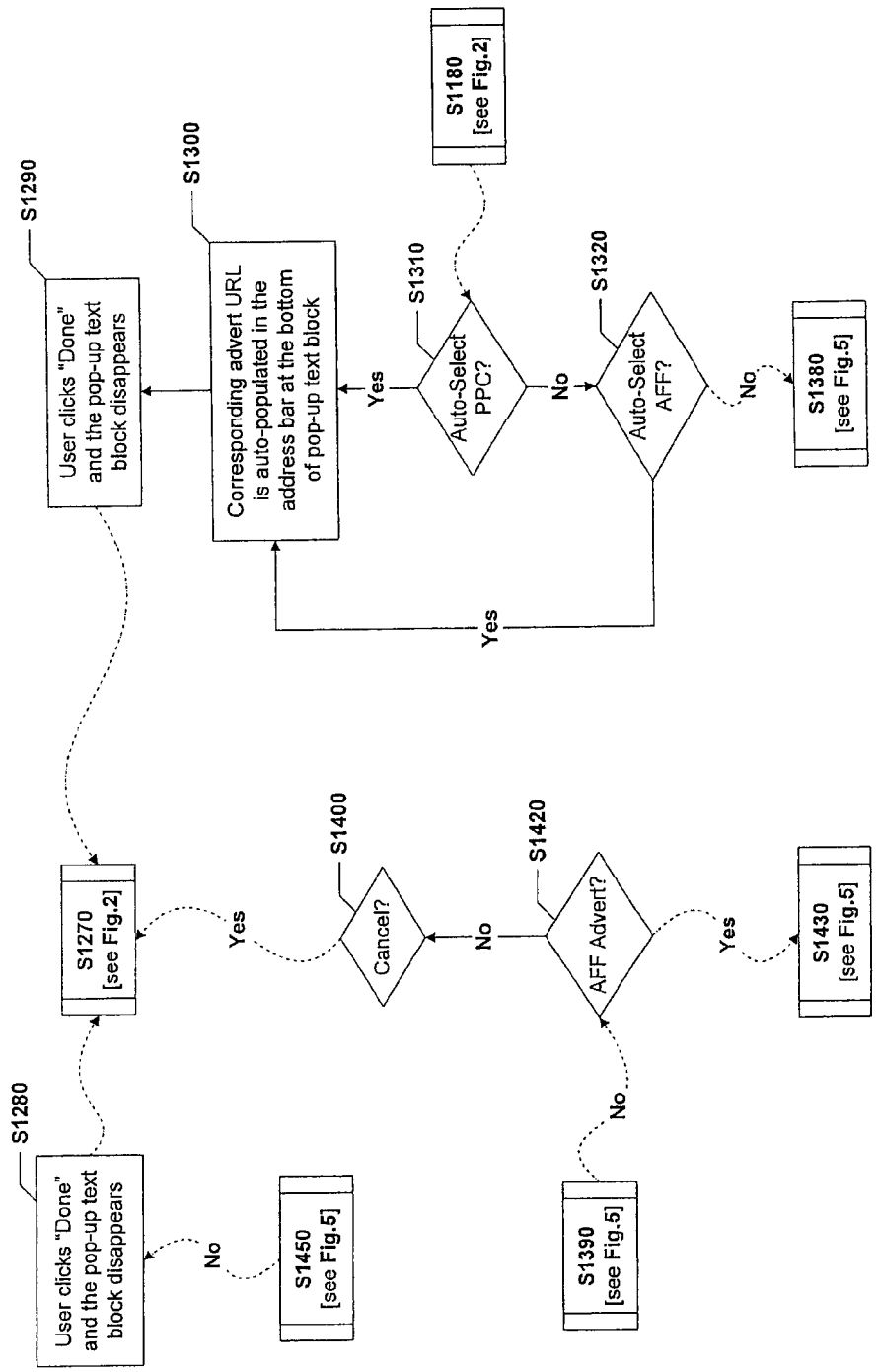
Figure 4:
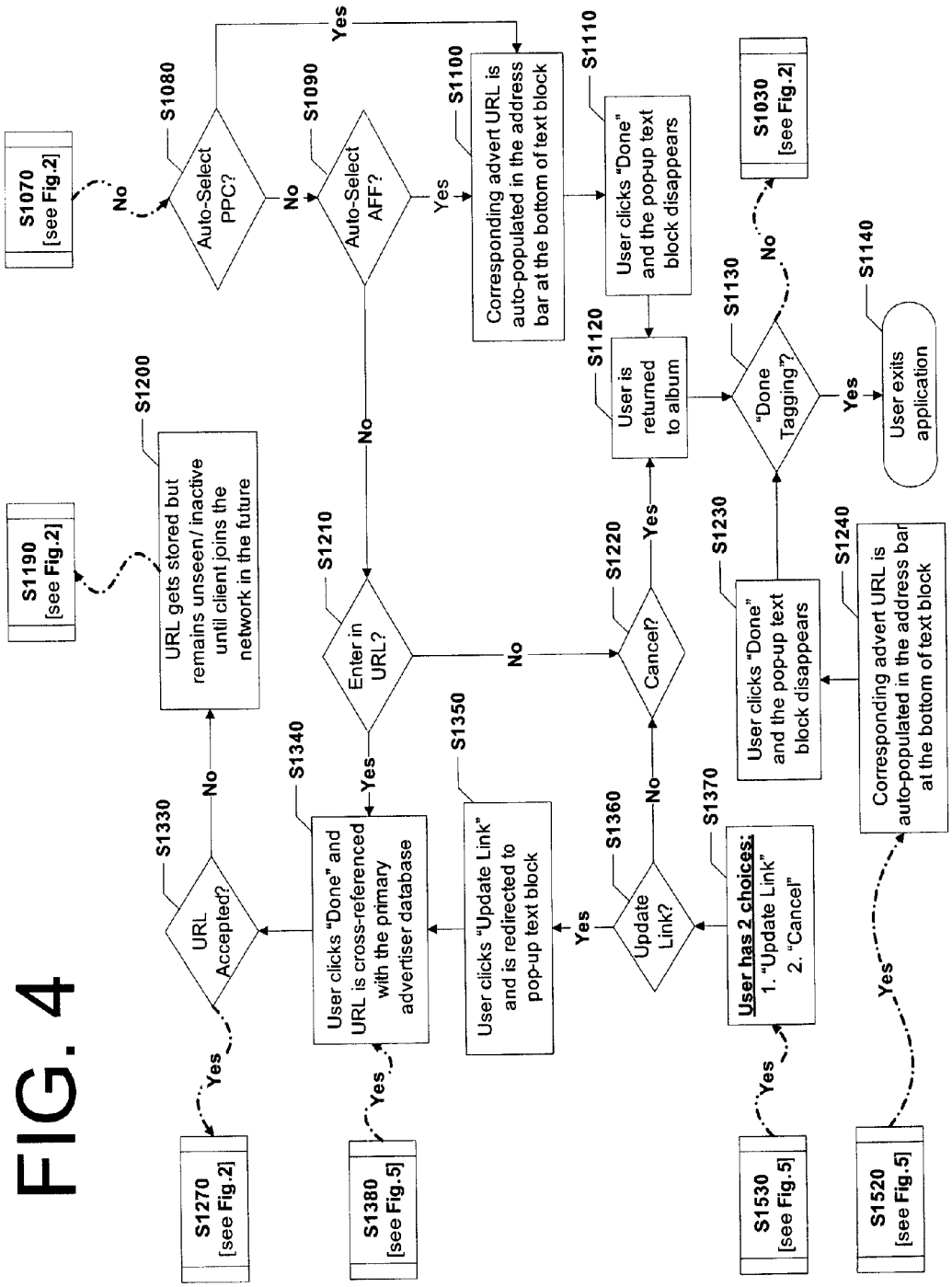
Figure 5:
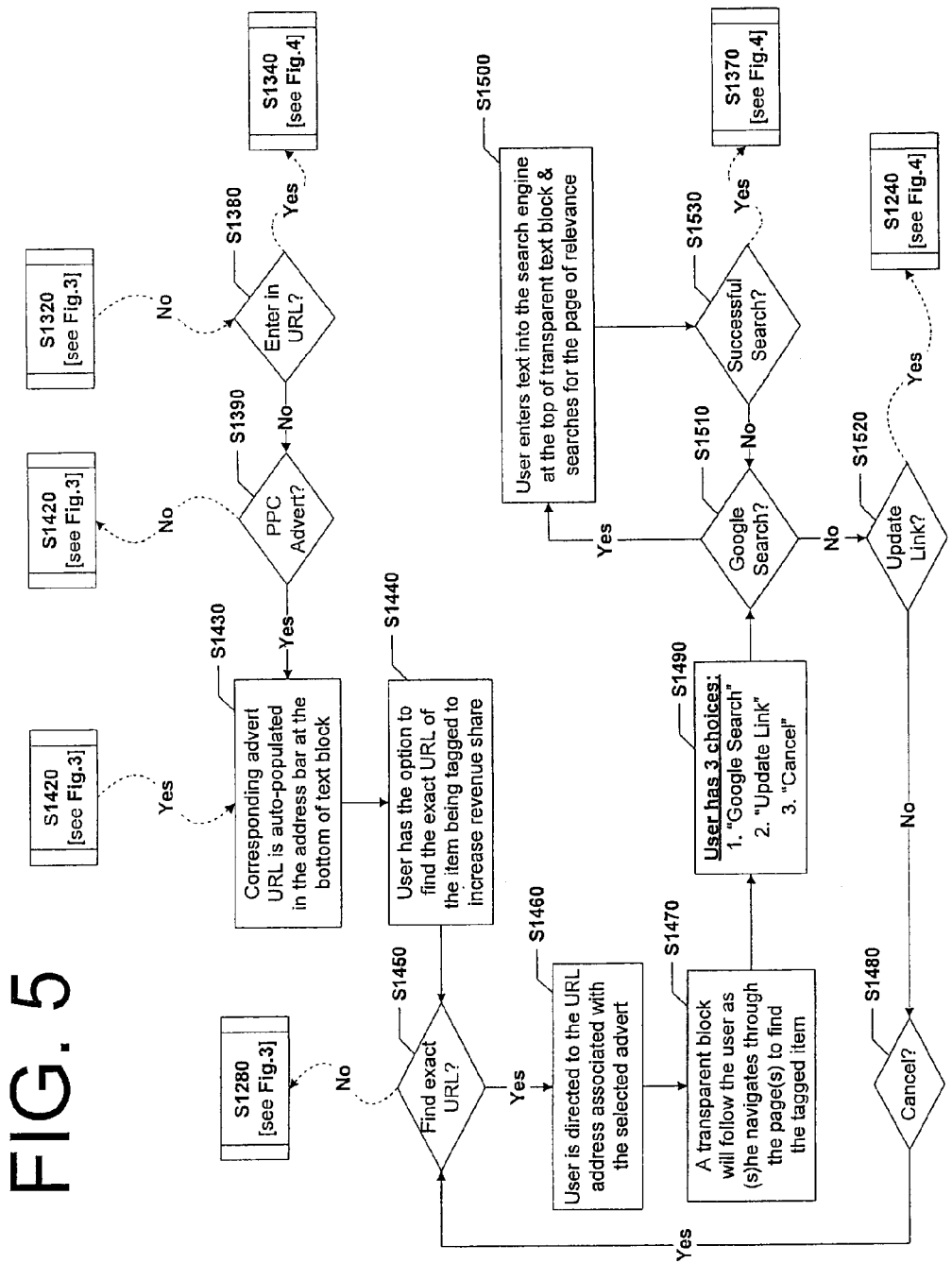

In step S1040 of FIG. 2, the user is prompted with a pop-up text block. The text block may prompt the user to describe the tagged item or area in the pop-up text block. In step S1050, the user enters text into a field within the text block to describe the tagged item. The pop-up text block may be partitioned, windowed or have buttons to present the user with choices regarding associating the selected item with an advertisement.

In step S1060 of FIG. 2, the user is presented with multiple choices: (1) click "Search," (2) check "Auto-Select PPC" (Pay-Per-Click), (3) check "Auto-Select AFF" (affiliate), (4) enter in URL or (5) select "Cancel." It will be understood that the user may be presented with fewer or additional possible options. The flowchart shows decisions for each of these choices. In step S1070, the user is prompted whether to search. If the user chooses to search, then in step S1170, the text block splits into two columns and displays the results of the search. In step S1160, the user is prompted to enter whether the search is successful. If the search is successful, the user is presented with six options in step S1180.

Instead, if the search of step S1070 is unsuccessful, and if the user inputs in step S1160 that the search is unsuccessful, the user can amend the search text in the pop-up text block in step S1150. The amended text is then inputted in step S1050.

If the search of step S1070 is considered successful in step S1160, step S1180 presents the user with six choices: (1) check "Auto-Select PPC" (Pay-Per-Click), (2) check "Auto-Select AFF" (affiliate), (3) select "PPC Advert," (4) select "AFF Advert," (5) enter in URL or (6) select "Cancel." The user may be prompted with these choices simultaneously or in sequence. Steps 1310, 1320, 1380, 1390, 1400 and 1420 correspond to the six choices presented in step S1180. In steps 1310 and 1320, the user is respectively prompted whether to "Auto-Select PPC?" or "Auto-Select AFF?" If selected, the URL of a corresponding advertisement is auto-populated into an address bar at the bottom of pop-up text block from the database of primary advertisers. If the user chooses not to auto-select PPC or AFF, in step S1380, if the user does not want to manually enter a URL into the address bar, the user is presented with a list of affiliated advertisements and PPC advertisements that are registered in the database of primary advertisers. The user in steps 1420 or 1390 may select one of the AFF or PPC adverts. If selected, in step S1430, the corresponding advertisement URL is auto-populated in the address bar at the bottom of the text block.

In 1440, the user is presented the option of finding the exact URL of the item being tagged to increase the user's revenue share. The user may further specify the exact URL in step S1450 or, if finished, proceed to step S1280. If the user chooses to further find the exact URL in step S1450, in step S1460 the user is directed to the auto-populated URL address that is associated with the selected AFF or PPC advertisement. Here, the user can navigate until he finds a specific URL. In 1470, the user is presented with a two-frame window, where the browser window shows the page corresponding to the URL and the title bar, a transparent block in a top frame, will follow the user as the user navigates through as many web pages as needed in the browser window to find a URL to associate with the tagged item.

In step S1490, the user is presented with three choices: (1) "Google™ Search," (2) "Update Link" or (3) "Cancel." Other search engines or search features can be used instead of Google™ search. In step S1510, the user decides whether to do the Google™ search, and if so, in step S1500, the user enters text into a search engine toolbar in the title bar and searches for the page of relevance, to be shown in the browser window. If the user determines the Google™ search is successful in S1530, the user in S1370 is presented with two choices: (1) "Update Link", or (2) "Cancel." If the search is unsuccessful, then the user returns back to step S1510. The user is presented with the choice of updating the link in steps 1520 and 1360 or cancel in steps S1480 and S1220. If the user clicks "Cancel" in step S1480, the user is then asked again if the user would like to find the exact URL in step S1450. If the user clicks "Cancel" in step S1220, then the user is returned to the album in step S1120.

If the user chooses to update the link in step S1360, the user clicks "Update Link" in 1350 and is redirected to the pop-up text block. In step S1340, the user clicks "Done" and the URL is cross-referenced with the associated database of primary advertisers. If the URL is accepted by the user in step S1330, then the user goes back to step S1270 as discussed previously. If the URL is not accepted in step S1330, then the user in step S1200, the URL gets stored but remains unseen or inactive until the primary advertiser joins the network in the future. The URL can in some instances be active whereby no payment is received. However, it is preferable that the coordinating system will not allow the URL to be visible or accessible. Only once the prospective primary advertiser joins the primary advertiser database will the URL link become active. If the prospective primary advertiser never joins, the URL can remain inactive indefinitely.

In step S1190, the URL gets forwarded to coordinating system as a prospective lead. Then the user returns to step S1180 where the user has six choices as discussed earlier.

Going back to step S1510, if the user chooses not to do a Google search, the user has the option to update the link in step S1520. If the user chooses not to update the link, the user is then choosing to cancel in step S1480 and then the user returns to S1450 where he can find the exact URL. From step S1450, the user can go to step S1280 or step S1460 as discussed previously.

Going back to step S1520, if the user chooses to update the link, then in step S1240, the corresponding advertisement URL is auto-populated into the address bar at the bottom of the text block. Then as the user clicks "Done" in step S1230, the pop-up text block disappears and the flow continues to step S1130, where the user is given a choice of whether to be finished tagging, or to return to step S1030. If finished, in step S1140, the user exits the application. If not finished, the user is returned to step S1030 and the process repeats.

Going back to step S1070, if the user decides not to search, in steps S1080 and S1090, the user is presented with the choices of "Auto-Select PPC?" and "Auto-Select AFF?" If the user chooses either of these options, then in step S1100, the corresponding advertisement URL is auto-populated in the address bar at the bottom of the text block. In step S1110, the user clicks "Done," and the pop-up text block disappears. In step S1120, the user is returned to the photo album containing the electronic image. In step 1130, the user is prompted whether to continue tagging. If so, the user returns to step S1030 to tag an additional item. If not, in step 1140, the user exits the tagging program.

If neither of the options in steps 1080 and 1090 are selected, then in step S1210, the user is given the option to enter in a URL. If the user enters in a URL, then the user goes to step S1340 as previously discussed. If the user does not enter in a URL, the user goes to step S1220 as previously discussed.

If the user agrees with the URL in steps S1280 or S1290 or selects to cancel in step S1400, in step S1270, the pop-up text block disappears and the user is returned to the photo album containing the electronic image. In S1260, the user is prompted whether to continue tagging. If so, the user returns to step S1030 to tag an additional item. If not, in S1250, the user exits the tagging program.

Figure 6:
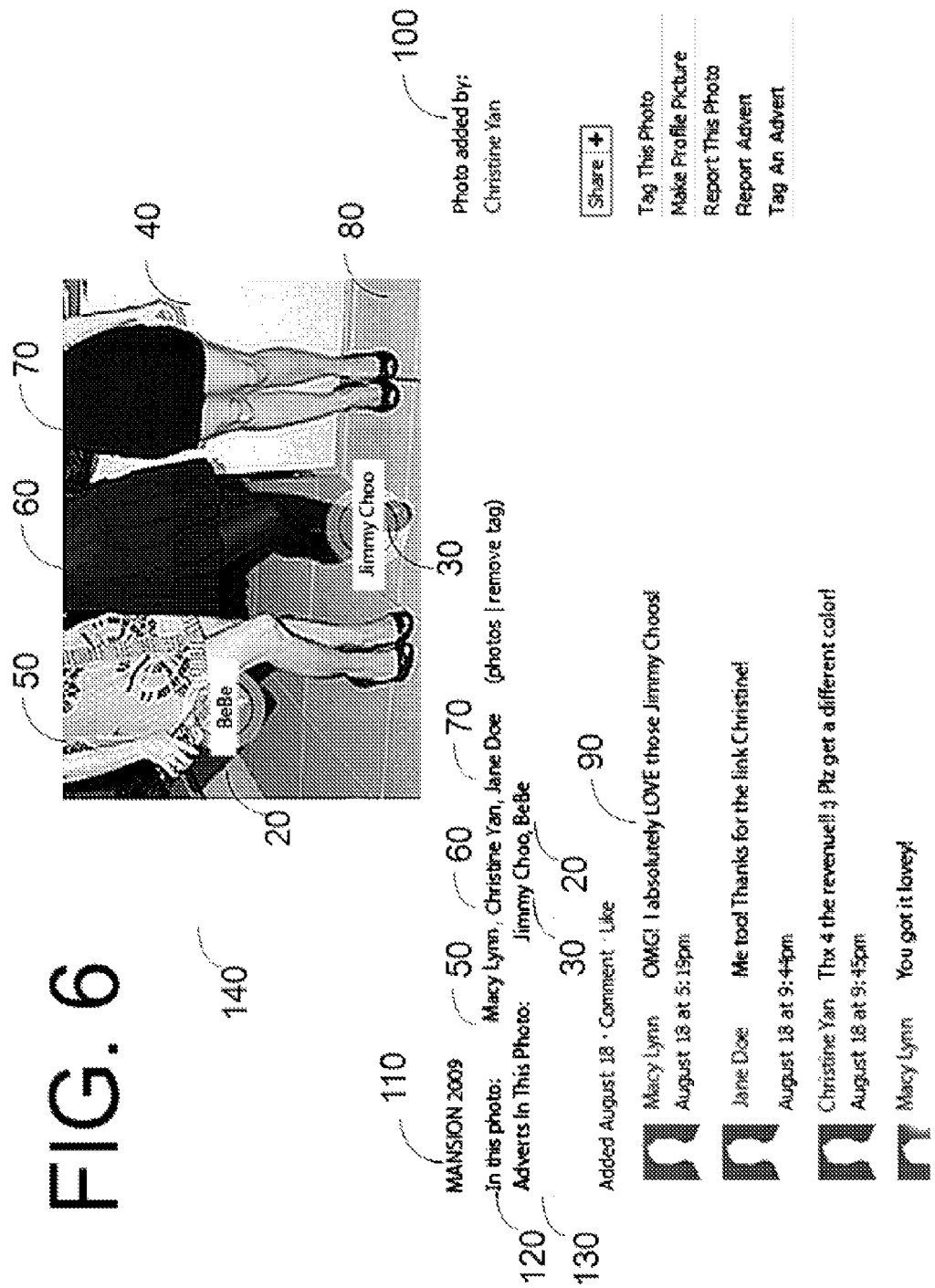

FIGS. 6-11 depict exemplary screenshots displaying the functionality of the embodiment of FIGS. 2-5 on the social networking site Facebook™. In FIG. 6, we see an electronic image 140 that was uploaded by Christine Yan 60. The electronic image 140 is a photo of three females: Macy Lynn 50 (left), Christine Yan 60 (middle) and Jane Doe 70 (right). Christine Yan 60 is also identified as the image originator 100. Facebook™ users would be familiar with the comments section 90 listing four comments, the image originator identifier 100, the image title 110 and the "In this photo" section 120 cataloguing the three females that have been tagged.

Two items in the image 140 have been previously tagged by the embodiment of FIGS. 2-5, and are marked by transparent bullseyes that appear upon a rollover the item or the picture. First, Macy Lynn 50 holds a BeBe™ clutch 20. Second, Christine Yan 60 wears a pair of Jimmy Choo™ heels 30. Jane Doe 70 does not have any items tagged. Jane Doe 70 is wearing an untagged dress and an untagged pair of heels.

An "Advertisements In This Photo" section 130 is added to the screenshot. This section catalogues the description of the items that have been tagged. The individual advertisements corresponding to the tagged items in the image 140 are listed here for the convenience of the user, so the user's Facebook™ friends can see that Jimmy Choo™ 30 and BeBe™ 20 are shown in the picture.

In FIG. 7, we see that the BCBG™ shoes 80 of Jane Doe 70 have also been tagged. Accordingly, BCBG™ 80 is listed in "Advertisements in This Photo" section 130. FIG. 7 shows a transparent box 150 at the top of the screenshot that instructs the user to "Click on product/services that you wish to tag." Box 150 also has a "Done Tagging" button 170 that the user clicks upon completion of the image tagging. The cursor can be a bullseye without a label, an arrow, or have any other desired configuration. In FIG. 7, the user holds and clicks over a dress 40, worn by Jane Doe.

In FIG. 8, after the user clicks on the dress 40 in FIG. 7, a pop-up text block with multiple sections has appeared over image 140. At the top of the pop-up text block, the user is presented with a search box 180 that says "Type any name or tag:" and a "Search" button on right that can be pressed. On the left and right are respectively auto-select PPC 190 and auto-select affiliate 200. In the far right section, a step guide description 210 says "Type in a word that best describes the item in the picture you put a bullseye on." These instructions 210 may change based on the user's actions or provide alternative instructions. Here the user could enter the word dress or the brand name of the dress in search box 180. Alternatively, the user can enter into a URL field the exact URL address for the tagged products. Below the URL field are the options of "Find," "Done" or "Cancel."

FIG. 9 shows a display in which the user has typed in a search term 290 "Guess by Marciano" into the search box 180. Upon the user clicking the search button, the user is provided with the options of "choose a Pay-Per-Click" 270 with four search results 250 or "Choose an Affiliate" 280 with three search results 260. Here, the user designated "Guess by Marciano" 240 in the four search results 250. Upon this designation, an auto-populated URL shown in the URL bar 220 corresponds to the designated Pay-Per-Click primary advertiser.

Alternatively, the user could have designated Auto-Select Pay-Per Click, which would have automatically performed the selection of one of these four search results 250 for the user, based on at least word association. As a second alternative, the user could have designated Auto-Select Affiliate, which would have automatically performed the selection of one of these three search results 260 for the user, based on at least word association. As a third alternative, the user could have entered the exact URL address.

The instructions 210 inform the user about a revenue-increasing option by finding an exact URL of the actual product page.

Figure 10:
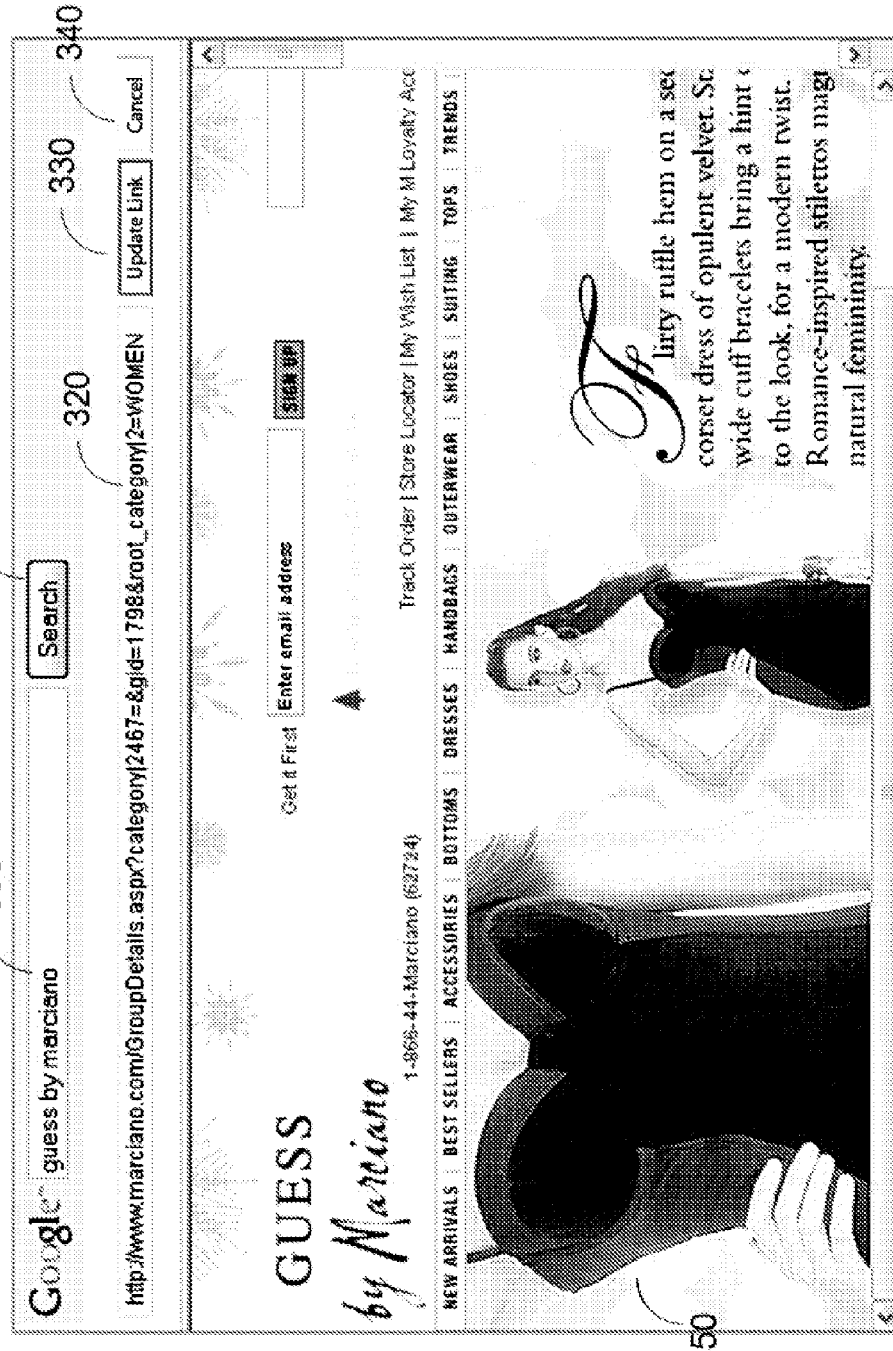
Figure 12:
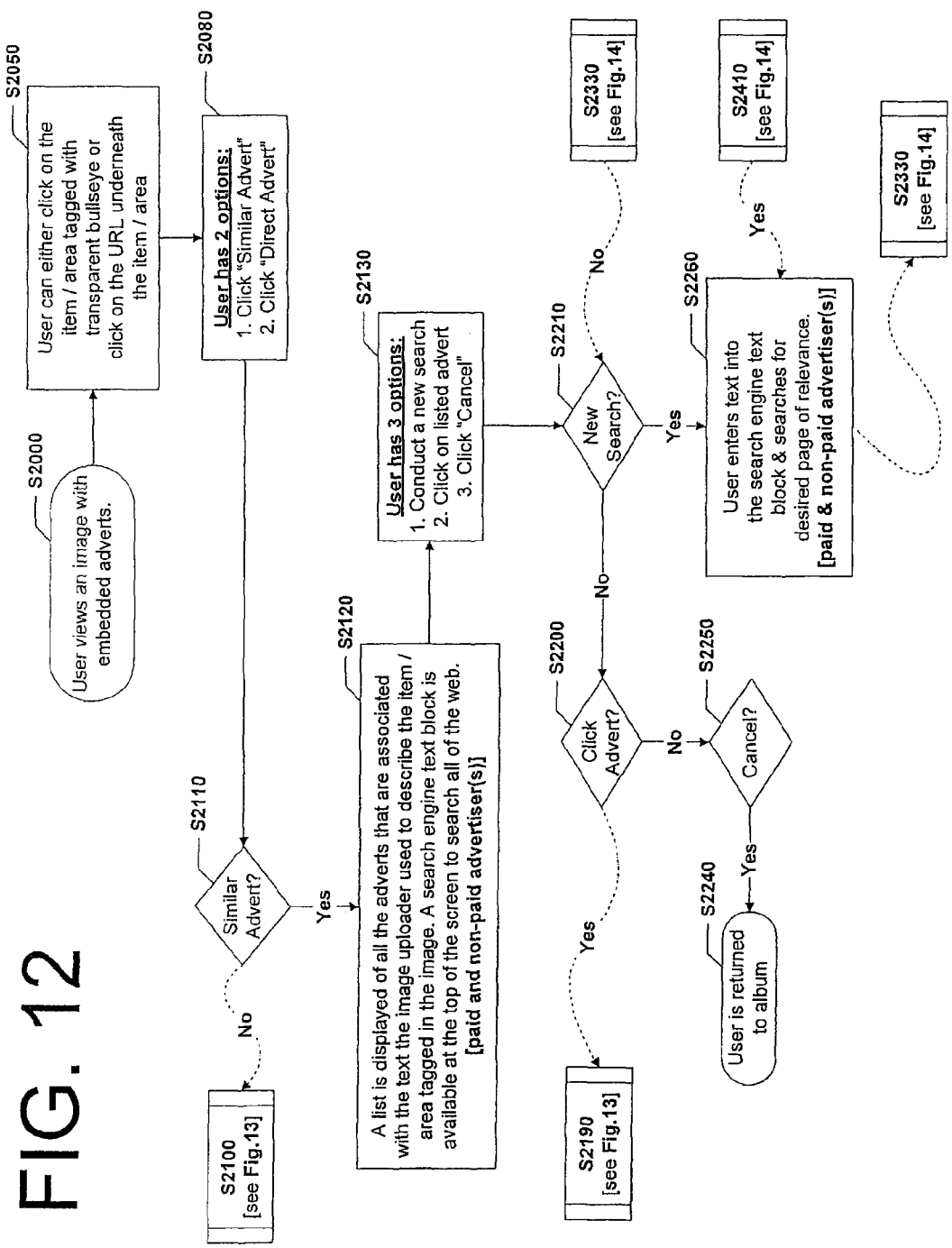
FIGS. 12-15 illustrate a flowchart depicting an exemplary user interface method.
Figure 13:
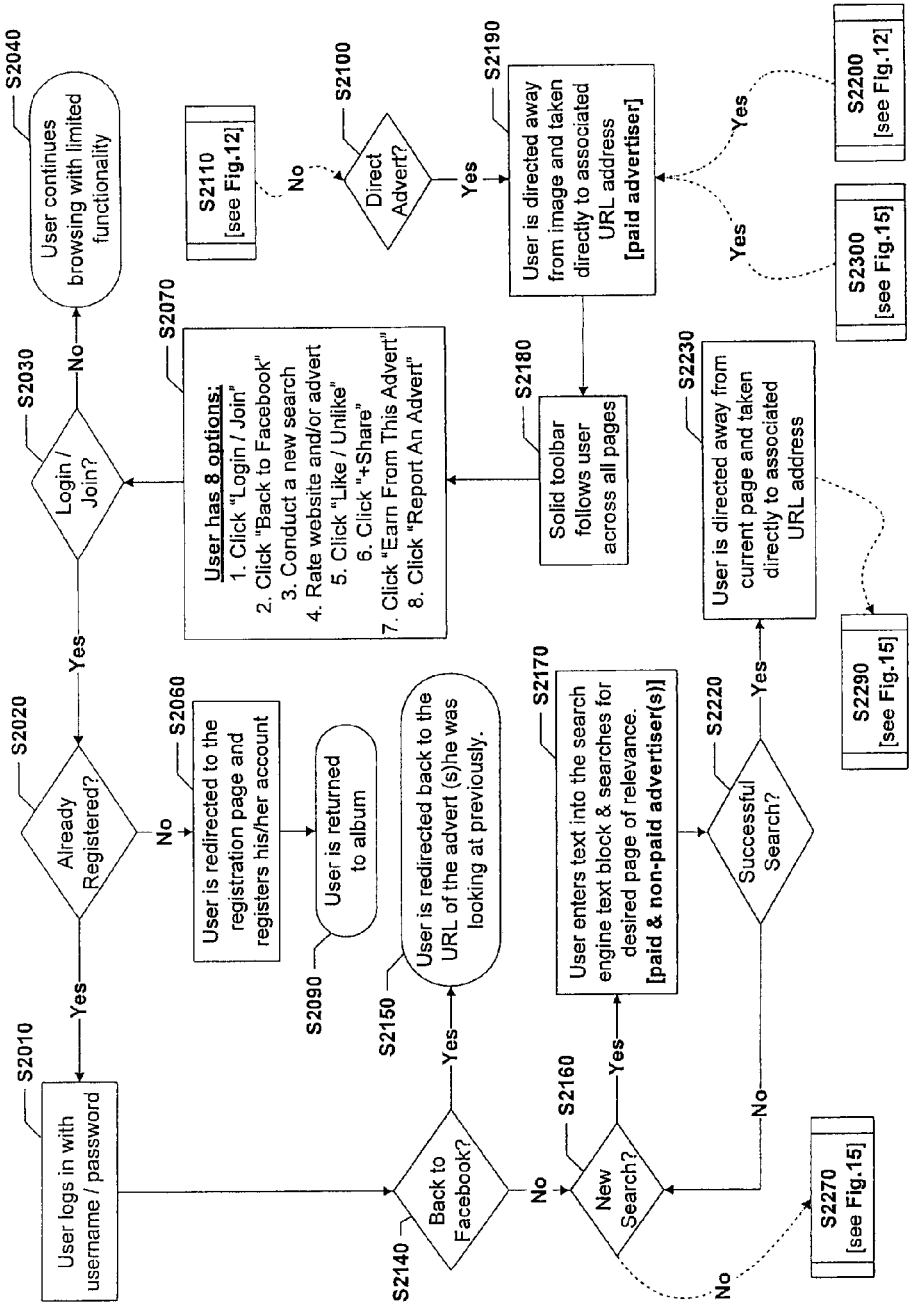
Figure 14:
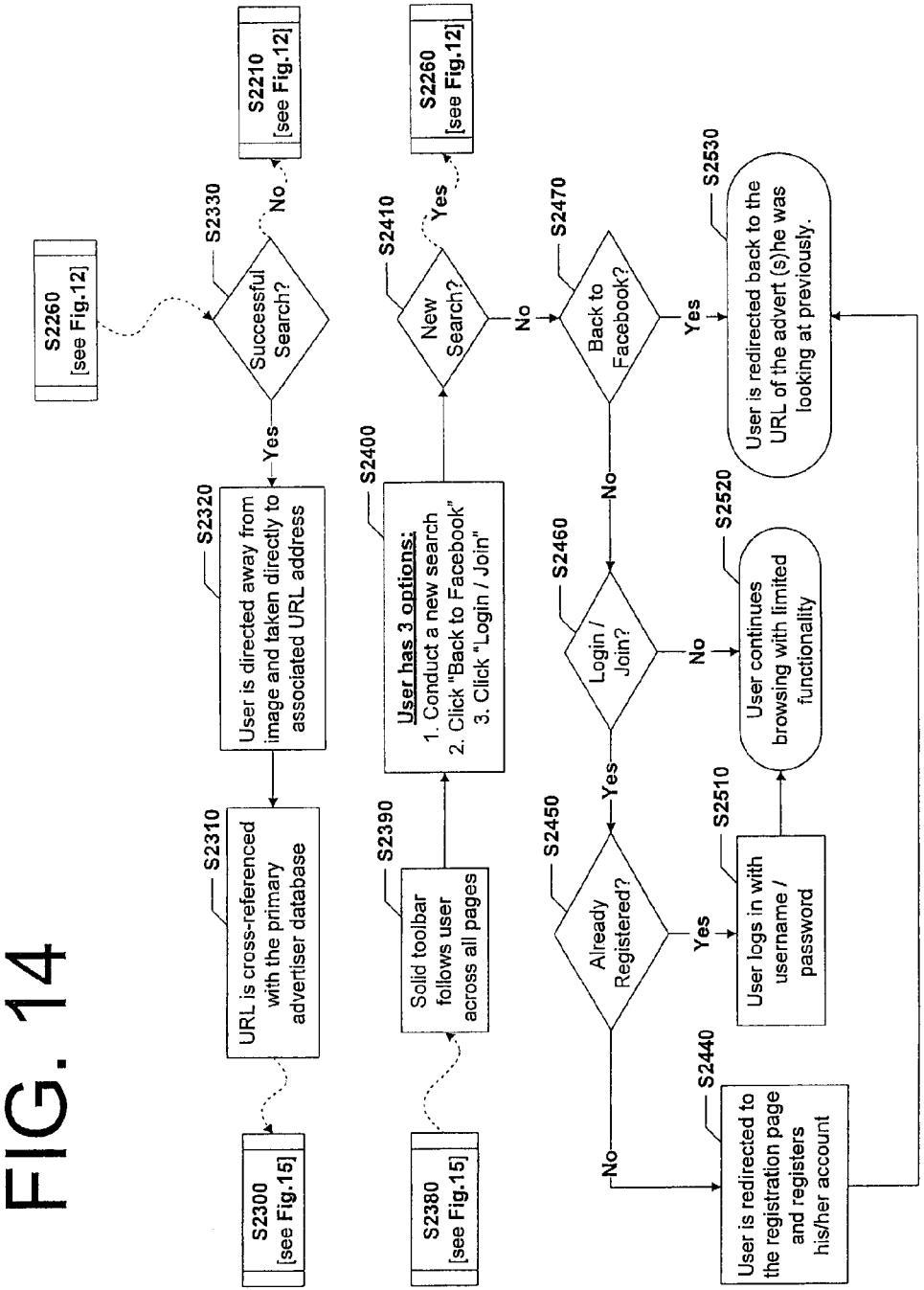
Figure 15:
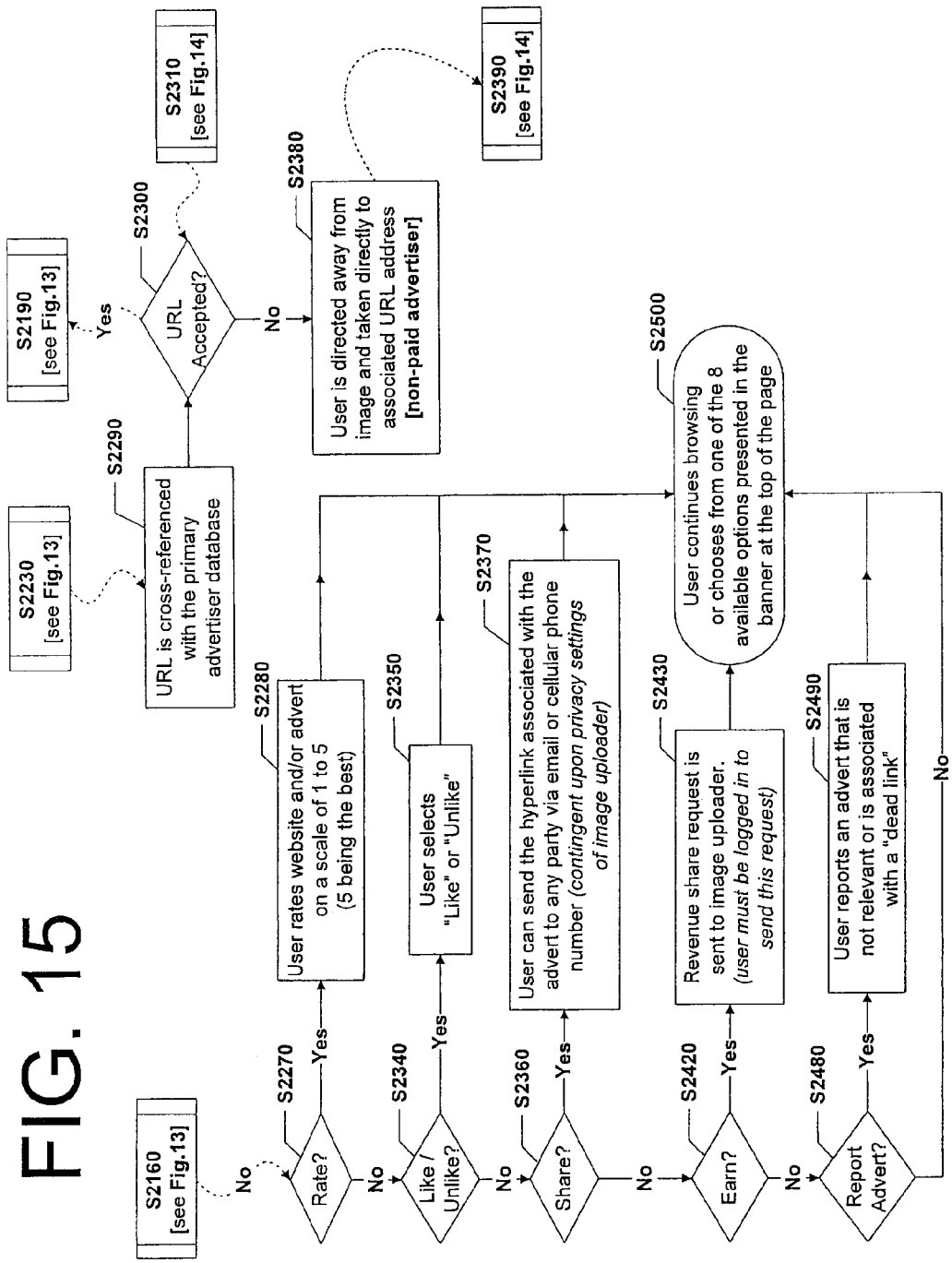

FIG. 10 depicts an exemplary screenshot of a display after the user clicked "Find" in FIG. 9 to find an exact URL. FIG. 10 depicts a display with a top frame ("a title bar") and a bottom frame ("a browser window"). The title bar includes a Google™ search engine toolbar 300, a Google™ search button, a URL bar 320 showing the current URL, an "Update Link" button and a "Cancel" button. The webpage 350 corresponding to the auto-populated URL in FIG. 9 (now the current URL) is shown in the browser window. The user's search terms 290 in the search box 180 of FIG. 9 is automatically typed into a text field in the Google™ search engine toolbar 300. The user can click on the Google™ search to perform a new Google™ search on the search terms 290. Alternatively, the user can change the search terms 290. When the user is finished searching for the desired URL, the user can click on "Update Link" button 330 or the "Cancel" button.

Figure 11:
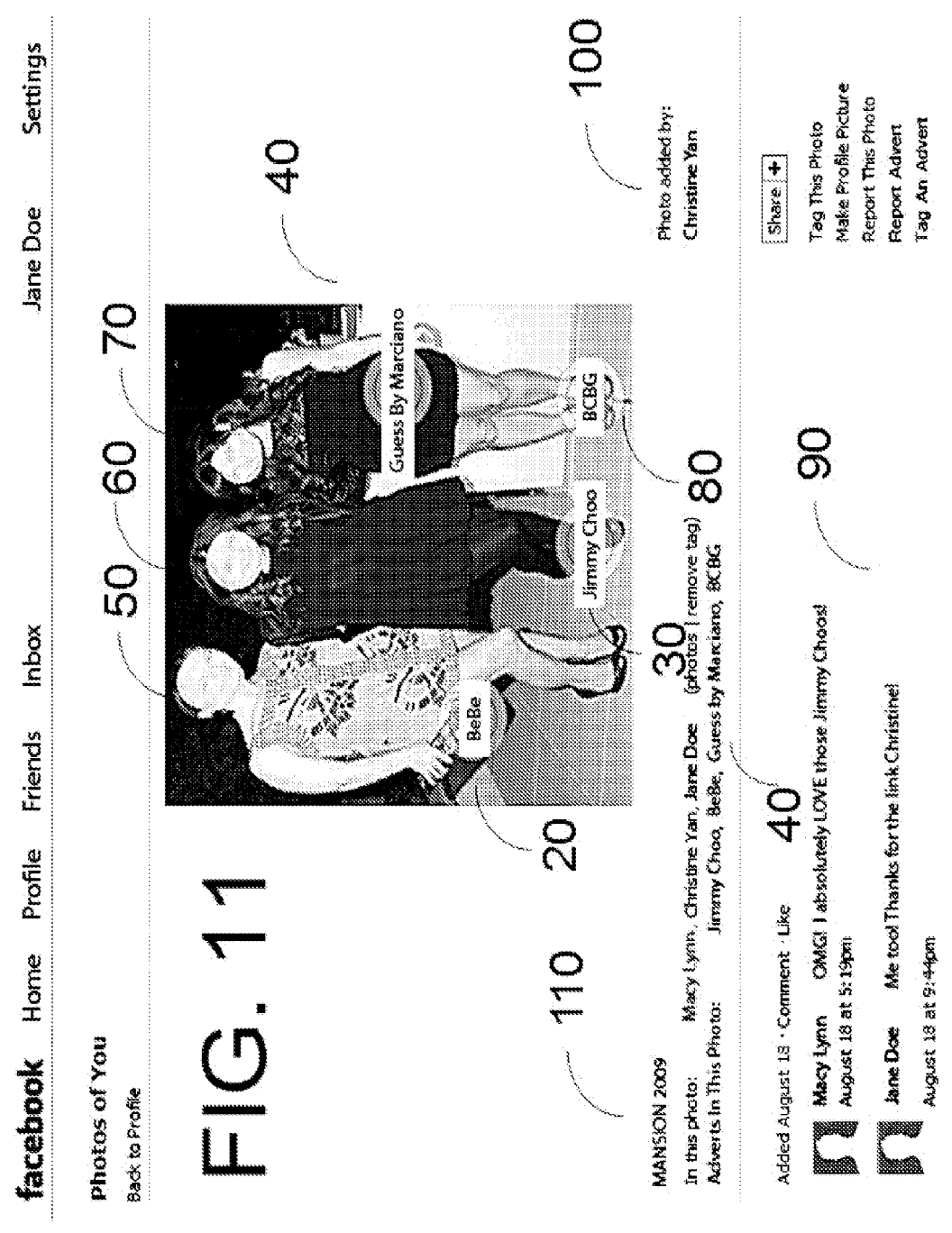

FIG. 11 now shows dress 40 as having been labeled with a transparent bullseye identifying "Guess by Marciano." The search term 290 of FIG. 9 becomes the tag label, which will appear upon a rollover of the item and will also be shown in the "Advertisements in this Photo" section 130. The tag label can be changed if desired.

The embodiments described herein have several advantages. As shown in FIGS. 1-11, the primary advertisers' lack of ability to control the URL associated with the image tag or the advertisement shown results in an advertising system that is personalized by secondary advertisers and thus may have a greater impact on the secondary advertisers' circle of friends and acquaintances. Secondary advertisers displaying to their contacts the names of products they have used or purchased may make these products more desirable to the contacts. As such, the tagging becomes a form of endorsement for products, and creates a personal advertising community. For this reason, primary advertisers may be willing to pay users and cede much of the control that they typically exert, to foster the personal advertising community. Websites will be able to take up more horizontal space (e.g., the actual visible area of the website on the display screen) earn revenue in a more subtle way, and remove outdated, overbearing, intrusive banner and/or other advertisements.

An exemplary front-end experience for a potential customer will be described below. When the potential customer views the image with embedded advertisement populated inside it, (s) he has the choice to either click on the visible text directly under the image or rollover and click on the item in the image tagged with transparent bullseye. By clicking on either the bullseye itself, the text under the image or the text superimposing the bullseye, the potential customer will be presented with the options of "Similar Advertisement" or "Direct Advertisement."

By clicking on "Similar Advertisement," the potential customer is directed to a landing page with similar primary advertiser's websites. Which similar advertisements appear can be based on word association(s), popular choices made by other users, etc. The potential customer is presented with three options: "Conduct a New Search," click on listed advertisements within the page or click "Cancel."

If the potential customer clicks on a new search, he is directed away from Facebook™ and sent to a search engine page with paying and non-paying website links and descriptions. The potential customer then enters text into the search engine text block and searches for a desired place of relevance, the place being a URL. If a potential customer finds a website in the general search section that is not a part of the database of primary advertisers, then the potential customer will only have limited use of the solid toolbar that follows the potential customer around while they shop or surf the web. When in limited use mode, the toolbar in the title bar can hide the full functionality and displays only three choices: (1) "Conduct a New Search" (which takes the potential customer back to the search engine page); (2) "Login/Join" (which will either log the potential customer in with his/her respective username and account information or will send the potential customer to the registration page and direct the user back to the previously visited page; or (3) "Back to Facebook™" (which returns the potential customer back to the album). The display of fewer choices may be performed by making the non-usable functions less visible, e.g., by "graying-out" the choices. In full functionality mode, all of the choices are available. In a variation, a limited functionality mode may have a choice that is not available in full functionality mode.

If the potential customer clicks on an advertisement then the potential customer is redirected to the URL address associated with the advertisement. Alternatively, if the potential customer clicks "Cancel" then (s) he will return to the image.

By clicking on the direct advertisement link, the potential customer is taken directly to the URL page of the item it is associated with. The system can be configured so that only paid advertisers can have a direct link created; therefore the functionality of all eight options in the solid toolbar are enabled subject to the potential customer being logged in and the advertiser using all of the options in their administrative settings. The application can give full or limited access to these options based on the potential customer's login information, or the lack thereof.

The 8 options are: "Login/Join," "Conduct New Search," "Rate Website/Advert," "Like/Unlike," "Share," "Earn From This Advert," "Report An Advert" and "Back To Facebook™." If "Login/Join" is chosen, "Login/Join" will upload the user's username and account information or send the user to the registration page and direct the user back to this point on completion.

Figure 16:
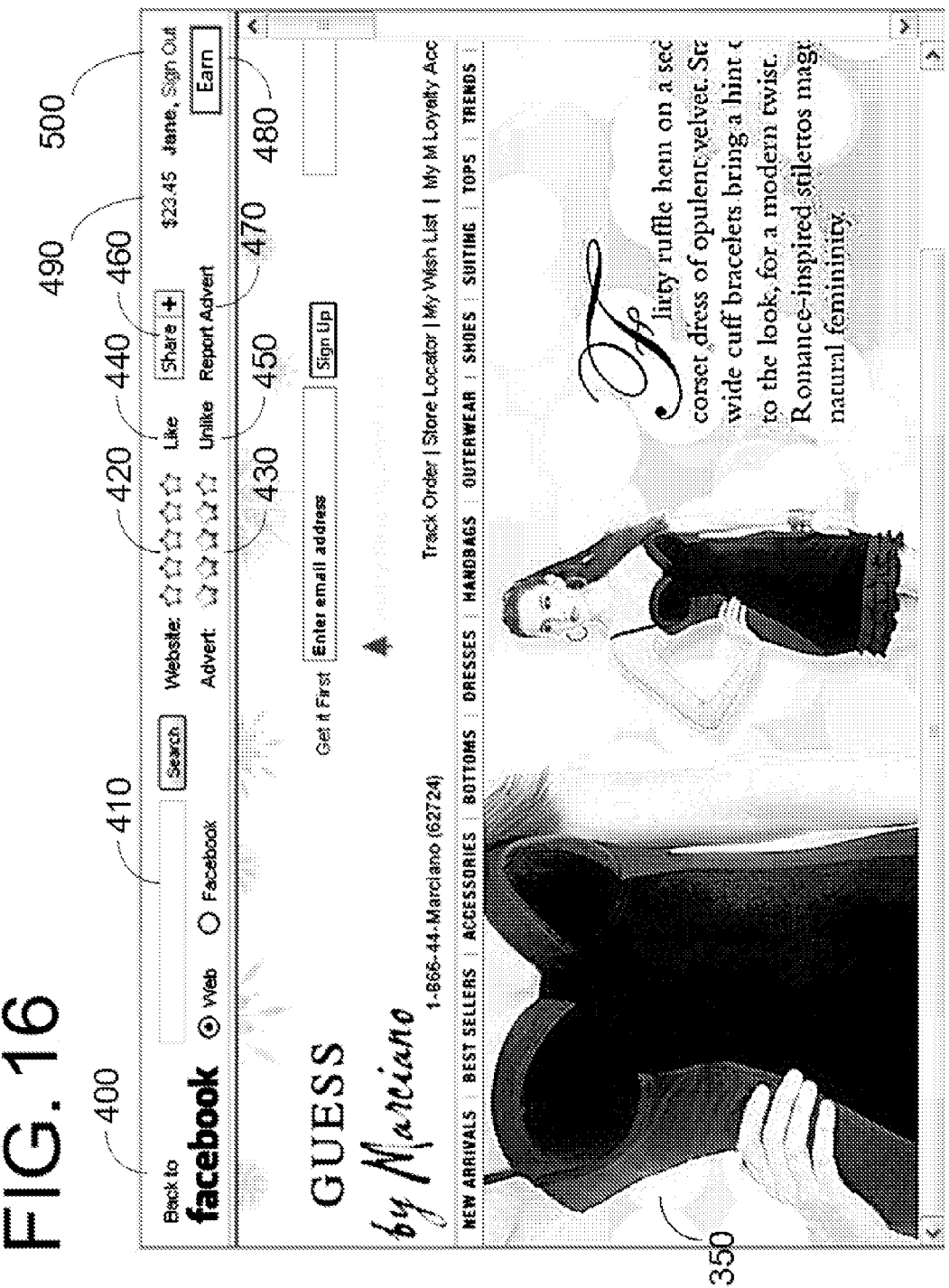
FIG. 16 is an exemplary screenshot that is viewable using the system depicted in FIG. 1 and/or the electronic media processing method depicted in FIGS. 12-15.

FIG. 16 is an exemplary screenshot depicting these 8 options in a toolbar in the title bar of the potential customer's browser window. The screenshot of FIG. 16 depicts a logged in potential customer, Jane. (A "Login/Join" option is not depicted.) A "Conduct New Search" option is available using the text field 410. "Rate Website/Advert" options are available using the rows 420 and 430 of star indicators. "Like/Unlike" options are available using the buttons 440 and 450. A "Share" option is available using drop-down text box 460. Here, the potential customer can choose to share using websites other than Facebook.com by using the drop-down menu. An "Earn From This Advert" option is available using button 480. A "Report Advert" option is available using button 470. An account balance 490 of the user in this example is $23.45. (In this example, the potential customer has a positive account balance because the potential customer is also a secondary advertiser with regards to other electronic media using the same coordinating system. In the case of a new potential customer who just signed up, the account balance would be $0.00.) A "Back To Facebook™" option is available using button 400. The browser window shows the Guess by Marciano advertisement chosen by the secondary advertiser in FIG. 10.

Returning to the example, if "Conduct New Search" is chosen, the potential customer types in a search term in the search engine toolbar within the title bar. From here, the potential customer browses the web, viewing paying and non-paying websites. The title bar will have full functionality when the potential customer is on a primary advertiser's website, and will have limited functionality with the potential customer is on a prospective primary advertiser's website. "Rate Website/Advert" is chosen, the potential customer can rate a website from 1 to 5 stars, (5 being the highest rating). If "Like/Unlike" is chosen, the potential customer can choose to "like" or "unlike" the advertisement/website. If "Share" is chosen, the potential customer can send a Facebook™ message with the link to a friend. If "Earn From This Advert" is chosen, the coordinating system sends a revenue share request to the secondary advertiser to split the commission. If "Report An Advert" is chosen, then the potential customer terminal 13 notifies the coordinating system 12. This should help prevent fraud and can prevent users from linking the electronic media to an unrelated website, service, product or otherwise. Lastly, if "Back To Facebook™" is chosen, the potential customer is returned back to the image in Facebook™.

The above description of the potential customer front end will be described in more detail with respect to FIGS. 12-15. FIGS. 12-15 together form a flowchart depicting the potential customer front end. Indicators are placed on the edges of the pictures with broken arrows to signify the continuation of a flow from one figure to another figure.

In step S2000, the system presents to the potential customer an image with the embedded advertisement, such as the one in FIG. 6. In step S2050, the potential customer can click on the tagged item (indicated by a transparent bullseye) or can click on a URL discussed beneath the entire area of the photo or below the item (such as in the "Advertisements in the Photo" section. In step S2080, the potential customer is presented with two options. The first option is (1) Click "Similar Advert" or (2) Click "Direct Advert." If the user chooses similar advertisements, in step S2110, then in step S2120, a list is displayed of all the advertisements that are associated with the text that the image originator used to describe the image or the area tagged in the image. A search engine text block is available at the top of the screen to search the entire World Wide Web. The similar advertisements include advertisements from both paying and non-paying primary advertisers.

In step S2130, the user is presented with three options: (1) conduct a new search, (2) click on a listed advertisement or (3) click "Cancel." In step S2210, if the user chooses to do a new search, the user goes to step S2260 where the user enters text into the search engine text block and searches for desired pages of relevance including paying and non-paying primary advertisers. In step S2330, if the search is determined to be successful, in step S2320, then the user is directed away from the image and taken directly to the associated URL address. (In step S2330, if the search is not successful, then the user goes to the previously discussed step S2210.) After a successful search, the URL is cross-referenced with the database of primary advertisers in step S2310. In step S2300, if the URL is accepted, then the user is directed away from the image and taken directly to the associated URL address which will be an address of a paying primary advertiser in step S2190. If the URL is not accepted in step S2300, the user is directed away from the image and taken directly to the associated URL address of a non-paying primary advertiser in step S2380. In step S2390, a solid toolbar follows the user across all of the pages.

In step S2400, the user is then given three options: (1) conduct a new search, (2) click "Back to Facebook™," or (3) click "Login/Join." If the user chooses to do a new search in step S2410, then the user is returned to the previously discussed step S2260.

If the user does not choose to do a new search in step S2410, then in step S2470, the user is presented with a choice of returning to Facebook™. If the user chooses to return in step S2470, in step S2530 the user is redirected back to the URL of the previously viewed advertisement. Alternatively, if the user chooses not to go back to Facebook™ in step S2470, the user is presented with an option to login or join the electronic media tagging application in step S2460. If the user does not login or join in step 2520, the user continues browsing with limited functionality in step S2520. If the user just chooses to login in step S2460 and the user is already registered in step S2450, the user logs in with his/her username or password in step S2510 and goes to the previously discussed step S2520. Going back to step S2450, if the user chooses to login in step S1180, the user is already registered, then in step S2220, the user is redirected to the application's main registration page where the applicant can register his or her account, and then to the previously discussed step S2530.

Going back to step S2130, the user was presented with three options. If the user in step S2210 chooses not to do a new search, then the user decides whether to click on the advertisement in step S2200. If the user chooses not to click on the advertisement, then the user is effectively choosing the third choice of step S2130, which is to cancel in step S2250. In step S2240, the user after canceling is returned to the album. If the user clicks on the advertisement, then the user goes to step S2190 Likewise, going back to the two options in S2080, if the user chooses "Direct Advertisement" in S2100, then the user goes to step S2190.

In step S2190, the user is directed away from the image and taken directly to the associated URL address, which is a URL of a paying primary advertiser. In step S1300, a solid toolbar follows the user across the pages. By this point, the user has navigated away from Facebook.com (or the participating website) and is browsing the World Wide Web. The user has the potential to "continue browsing" the web limitlessly but has a will always have the eight options available to him/her as the solid toolbar will be available at the top of the window, respectively.

In step S1310, the user is given eight options: (1) click "Login/Join," (2) click "Back to Facebook™," (3) conduct a new search, (4) rate website and/or advertisement, (5) click "Like/Unlike," (6) click "Share," (7) click "Earn from this Advert" and (8) click "Report an Advert."

As an option, in step S2030, the user is given the option of login or join. If the user chooses not to login or join, then in step S2040, the user continues browsing with limited functionality. Instead, if the user chooses to login or join and if in step S2020 the user is already registered, the user then logs in with his/her username and password in step S2010.

If the user is not registered in step S2020, the user is redirected to a registration page and registers his/her account. In S2090, the newly registered user is returned to the album.

As second and third options, in steps S2140 and S2160, the logged-in user can choose between going back to Facebook™ or requesting a new search, respectively. If the user chooses to go back to Facebook™ in step S2140, the user is redirected back to the URL of the advertisement (s) he was looking at previously in step 2150. If the user chooses to do a new search instead in step S2160, then the user goes to step S2180, where the user enters text into the search engine text block and searches for desired pages of relevance, the pages including those of paying and non-paying advertisers.

In step S2220, if the search is unsuccessful, then the user returns to step S2160 and may keep searching in steps S2160, S2170, and S2220 until the search is successful. Once the search is successful, in step S2230, the user is directed away from the current page and taken directly to the associated URL address. In step S2290, the URL of the tagged advertisement is cross-referenced with the database of primary advertisers, and the user can then choose to accept the URL in previously discussed step S2300.

Going back to step S2160, if the user decides not to conduct a new search, as a fourth option, in step S2270 the user can choose to rate or not to rate. In step S2280, if the user chooses to rate then the user rates the website on a scale of, for example, 1 to 5 with 5 being the best.

As a fifth option, if the user chooses not to rate, the user can choose to make a "Like" or "Unlike" choice in step S2340. In step S2350, the user selects "Like" or "Unlike" for an advertisement.

As a sixth option, if the user does not want to rate in step S2270, or choose "Like" or "Unlike" in step S2340, the user can choose to "Share" in step S2360. A "Share" option could include buttons to allow a user to share an article, via platforms such as Facebook™, MySpace™, Digg.com™, Delicious™, email, LinkedIn™, Twitter™, etc. If the user chooses to share, then the flow goes to step S2370 where the user can send the hyperlink associated with the advertisement to any party via email or cellular phone number in step S2370. In step S2370, the ability for the user to send is contingent upon the privacy settings of the image originator (e.g., the secondary advertiser). For example, if the image originator does not want to share the image or to allow the image to be shared, then the user who is viewing the image does not have the ability to share beyond the originator's control. Therefore, the image originator has control over the potential customers. However, if the image originator allows for sharing, then the potential customer can send the hyperlink to any other entity via email or cellular phone.

As a seventh option, if the user chooses not to share, the user can then choose to earn in step S2420. If chosen, a revenue share request in step S2430 is sent to the image originator. Here, the user must be logged in to send the revenue share request.

Secondary advertisers may get the following commissions. A percentage of per-click revenue is issued to reward advertisements originating from the secondary advertisers' image(s). In addition, a percentage of the revenue is issued to reward a purchase that was made after following a link that originates from the secondary advertisers' image(s).

Websites hosting the images can earn each time a user earns revenue.

Once a secondary advertiser is registered with the coordinating system, the secondary advertiser can view both past and current earnings at any time by signing into the secured website through an interface unit. Users can track in detail a variety of information. These include, but are not limited to: the total number of ad clicks, bounce rates, number of impressions, historical and current affiliate revenue. A "bounce rate" is the percentage of single-webpage visits or visits in which the person left one site from the entrance (landing) page.

If someone that sees any advertisement wants to "share" the image with their friends and also earn revenue, they can simply click on that option and a "shared revenue request" will be sent to the originator. If accepted, the image is then stored in the new user's archive where it is added to their portfolio for other people to see the image and click on the advertisement(s). The users may be able to barter and agree upon a rate to share the revenue upon acceptance, (i.e. 50/50, 60/40, etc.). This process can be repeated but only the first secondary advertiser will get a "split revenue share request" even if the image was found in someone else's archive.

If potential customers notice that an advertisement has no relevance to an image, an option to report the image and/or advertisement will be available. The system may be programmed such that if enough potential customers report an advertisement, (e.g., 5 people), a message will be sent to the secondary advertiser that uploaded the original image, stating, e.g., "If you receive one more report on an advertisement (e.g., Nike™ walking shoes) for this image, (e.g., http://www.johndoe.com/walking.jpg), your image will be untagged and earnings will be forfeited." There may be various options to reply: If the secondary advertiser wishes to ignore, they may cash out and nothing further comes of the report. If the secondary advertiser changes the link, they can lose all of the commission earned to that point. Some advertisers may cancel or the link may expire, without requiring the secondary advertiser to forfeit earnings.

If a pattern of advertising abuse has been identified and a secondary advertiser is assumed to be misusing advertisements in order to gain revenue, a computer-generated email can be sent to the secondary advertiser with a final warning that the shared revenue option will be removed for a certain period, e.g., 3 months. After that period the secondary advertiser may be entitled to try again. If the secondary advertiser persists, a permanent ban can be enforced.

If the secondary advertiser wishes to challenge the validity of the report, they can reply using the "challenge" option and an email will either be sent to the advertiser (i.e. Nike™), the administrator of the website (i.e. Facebook™) or the coordinating system for evaluation. Based on the result of the evaluation, the advertisement will either be removed or become officially validated.

As an eighth option, if the potential customer chooses not to earn, the potential customer can report the advertisement in step S2480. If chosen, in step S2490 the potential customer reports that the advertisement is not relevant or is associated with a dead link. If the potential customer chooses to report an advertisement, the potential customer is taken to step S2500. Step S2500 is also of the step after S2280, S2350, S2370, S2430, and S2490. In step S2500, the user continues browsing from one of the eight available options from step S2070 presented in the banner at the top of the page.

Various additions to the above-described potential customer front end are described below. The system may be configured so that secondary advertisers can block images seen by other people but if advertisements are displayed then the secondary advertisers will have to allow any company paying for an advertisement to verify its authenticity, (i.e., if a report of the advertisement is filed). The advertiser is given a time limit (e.g., twenty-four hours, seven days, fifteen days, or one month depending on the structure in place) from the time of submission to either authenticate or reject a URL link.

For example, the secondary advertiser can extract the URL of the image by, e.g., clicking the image, going to "Properties", copying the image's location and then pasting this location into the address bar of an Internet browser. (This example is in a Windows-based environment. Other systems are possible.) When an advertisement is created as described above, this URL address can be automatically extracted by a software application and/or programming system and method(s) and can be sent to the participating primary advertiser to view the new advertisement created.

As another option, the electronic media can be 100% clean with no "transparent bullseye", a distinguishing mark or the advertisements displayed. The system can be configured so that the only time the "transparent bullseye" and/or advertisements can be seen is when, e.g., upon a rollover of the item, by a potential customer over the area of the image where an advertisement has been placed by the secondary advertiser. Below each tagged image the words "Advertisements In This Photo" may appear and the name(s) of the advertised item(s), business(es), service(s), etc., may be displayed in a hyperlink format. The photo can still be saved without any of the embedded advertisements contained within, as a user who is not familiar with this application may be accustomed. If the user likes the tagged item(s), business(es), service(s), etc., in the image, (s) he can either click on the "transparent bullseye" or the text below the advertisement to be sent directly to the primary advertiser's link.

Different parts of this system can be replaced by activities of persons, which should not change the functionality of the system or the scope of the disclosure. For example, a less experienced user may not know how to upload electronic media or tag an image, but this less experienced user can request that a telephone operator that works for the owner of coordinating system scan, upload and tag the electronic media for the senior user, who then becomes the secondary advertiser. In this example, a secondary advertiser may send hard copies of electronic media and a hand marked-up copy to the coordinating system for a person to enter. In another example, a primary advertiser may use an advertising agency, who then requests an owner of the coordinating system to enter the primary advertiser information or revenue generating transactions directly into the coordinating system 12.

Businesses can also be secondary advertisers. However, there may be controls so that businesses cannot advertise themselves using the system.

The electronic media can also include text. For example, secondary advertisers may have the option to highlight two, separately grouped lines of words in status update(s) within Facebook™ and/or tweets within Twitter. The secondary advertiser may be able to attach a URL to their status updates and/or tweets that will send other users that click on the associated hyperlinked text to either an image landing page or a text advertisement page, or will activate a voice call through, e.g., Voice Over Internet Protocol (VOIP) to a number associated with the corresponding URL address. If the user wants to limit the access of who can see the URL link in the text, the secondary advertiser may also have the option of discreetly tagging a friend, fan, or follower in the status update(s) or tweet(s). Discreet tagging is when the URL, notifications and any newsfeeds related to the tagging are not available to the public to see. In this way, only the party tagged can see the URL.

The first time that a secondary advertiser logs on through any of the channels that use "electronic media advertisement tagging feature," the secondary advertiser may be prompted to either activate the "electronic media advertisement tagging feature" or leave it inactive. In order to participate, each individual can be required to activate their account by registering their email address, postal address and/or social security number or other verifiable identification details directly with electronic media processing apparatus, a database of primary advertisers and/or the database of revenue generating transactions through a secured network (users will not leave the shell of the website to register). As a security feature, secondary advertisers can be required to link all of their revenue sharing accounts together to prevent fraud.

If managing the URLs, websites and users becomes unmanageable by the coordinating system, then the coordinating system can be configured so that a potential customer that clicks on an advertisement can be taken to a landing page first, describing the website that they are about to open, further preventing unnecessary or fraudulent clicks.

For example, if secondary users, primary advertisers and potential customers have several accounts with social media and/or image storing sites resulting in a large number of clicks being made, then to reduce clicking and to manage the volume of people and accounting, the coordinating system can put a policy into place that will narrow the amount of illegitimate click-throughs. Instead of directing the potential customer directly to the advertisement, the potential customer can first be directed to a landing page that explains what the potential customer is about to view. In this way, when the potential customer decides to continue from the landing page to the advertisement, the potential customer is indeed serious about viewing and/or buying the product or service explained. The charging system can be modified in a way that, instead of charging the primary advertiser straight away, the primary advertiser will only be charged after actions that take place post-landing page.

In addition, if a potential customer clicks on an image advertisement link, the potential customer can be presented with the two options "Direct Advertisement" or "Similar Advert." Clicking "Direct Advertisement" would open the advertisement. Clicking "Similar Advertisements" would open a new window, in which the potential customer would see all of the associated advertisements that were first seen by the advertisement originator based on the words and/or phrases used to describe the tagged item(s) within the image. For example, an algorithm that ranks advertisements according to relevance based on word associations can aid in choosing which similar advertisements would open next. Ranking can be based on other factors known in the art, such as by the historic action of other users.

Potential customers may be allowed to initiate a voice call advertisement. For example, a potential customer may be allowed to click on an appropriate link that either navigates by voice around a website or connects the potential customer to a designated call center directly through (VOIP) or is patched through to his or her phone.

Secondary advertisers may have an option to write a paragraph description about an image they have uploaded or the album itself. The algorithm can identify the text (similar to how Google™ AdSense™ currently works within blogger websites). The text entered by the user will trigger the system to search, associate, and automatically add advertisement URLs onto the image based on word or phrase association. The automatic system can link up multiple relevant advertisements per image (e.g., four), based on the text data entered by the user to describe the image or the album itself.

Instead of shopping originating from a search engine result or exposure to text-only advertisement(s), potential customers may be allowed to shop directly from the site where their content is stored (e.g., Facebook™, ImageShack™, etc.). Potential customers may be allowed to type in a word or phrase into the search engine toolbar and view all of the images related to the word or phrase typed. All secondary advertisers that leave their images "open to everyone" will have their images displayed on this landing page, (similar to the technology of Google's Swirl), which in turn creates yet another platform for them to earn advertising revenue based on their images. This same concept can be replicated for universal status updates and tweets as well. Advertisers and/or businesses looking to market can upload images of or that represent their products/services at a fee, (e.g., $1 per day, per image, or a flat fee, or based on previously mentioned financial model(s)). These images may be placed only on the landing page. An advertiser or business looking to market may also be allowed the option of having its website's URL address below the image, and may be allowed, e.g., one line of text to describe the image.

Website owners looking to increase their market exposure or increase their amount of traffic can invite an image originator to review and rate their websites. The algorithm may be structured to identify secondary advertisers that have uploaded advertisements relevant to a website owner's business and can give the advertising website owner an option to send an invitation to these secondary advertisers to rate and review its website. By default, the website will also gain exposure. Website owners can pay these secondary advertisers a small fee to review and rate their websites. A primary advertiser can pay extra if the primary advertiser wants to invite and/or authorize only secondary advertisers that have over a certain number of clicks or a specific status (e.g., similar to Ebay™'s star rating system) to review and rate the websites of the primary advertisers. Such a click history or rating system establishes the credibility of the secondary advertiser. A time requirement can be calculated so that website owners get their money's worth (e.g., $4 for reviewing a website for 10 minutes). A clock will count down backwards, in a solid bar, and users can be required to view a minimum, e.g., five pages, and make comments, e.g., at least five.

Similar to how Google's Swirl™, Face.com™, and the Phototagger™ application work on Facebook™, the application can be programmed to recognize the same images and prompt the secondary advertiser (e.g., "Would you like to tag multiple, recognizable images with this URL?"). If yes, the item recognizing software will search through all of the respective albums and bring up the images that it recognizes as containing the same item. This will allow a secondary advertiser to set-up multiple advertisements simultaneously and with minimal effort. This is a favorable way of capturing past uploaded images in both a timely and efficient manner.

When uploading an image, secondary advertisers may be allowed to input data and a description about the image such as location, the type of event, etc. Based on the description provided, the system may automatically upload advertisements for a plurality of relevant images based on the text provided. The text need not be public, and only the secondary advertiser may be able to view and edit the text. The text can be used as a fast and economical way of tagging single images and multiple images. The text can also be used to capture information to be used in various algorithms and processes related to the text box or the end-user interface.

In desktop applications, the user can be directed offline to the advertisement embedded within the electronic media without having to first be logged in to the coordinating system. For instance, a desktop application can let a user to stream all of their photos on their desktop(s) without having to be logged into the coordinating system, e.g., Facebook™, Imageshack™ and Flickr™. In variations of the above embodiments, advertisements can be embedded within this offline media without the requirement of the user to be logged into coordinating system. For example, a potential customer may be able to click on the advertisement associated URL link(s) within an image from his or her desktop and be directed to the corresponding URL address.

In addition, as users are friends with one another, letting them advertise adult content sites can also be an option. A potential customer may be taken to a landing page that prompts to the potential customer that he or she is about to enter an adult content website. As long as the image is private and the image is not outside of boundaries of what is permitted on the respective social network and/or image storing website, a secondary advertiser may be able to tap into this market as well. Special tag types or other indicators can be added to categorize electronic media and advertisements containing adult content. Alternatively, such content can be determined from the website or domain name, and the relationships may be automatically determined. However, secondary advertisers will be limited to which of their friends will associate with and/or accept adult content sites, and advertisers in these campaigns will have to decide who they will and will not accept.

The URL links can go to a landing page first that explains to the user what type of advertisement they are about to look at. A landing page is any page on a website where traffic is sent specifically to prompt a certain action or result. Users will have the choice of navigating back to the social networking or image storing site (e.g., Facebook™, ImageShack™, etc.), or continuing on to the URL of the advertisement.

As discussed above, users can advertise inside of videos. Each video can pull a screenshot every few seconds, or frames of the video. Facebook™ currently provides functionality so that a user can see what the video is about before watching it in its entirety. Originators can tag items in screenshots, or frames that are created every 2-5 seconds. By using image/item recognition software like a line grabber tool, (e.g., Photoshop's "magic wand" tool), or Face.com™'s image recognition software, items that are tagged will be followed throughout the video so that if a user rolls over the video at any point, the video will pause and the tagged items in the video will become visible. Alternatively, the video can show the associated advertisement's URL link.

Videos can have additional functionality compared to that associated with still images. Videos can be paused if a rollover over the advertisement occurs. Follow the item tagged by displaying a distinguishing mark or "bullseye" throughout the video upon a rollover. A click on the distinguishing mark or "bullseye" may send the user to the advertisement's designated website. At the end of a video, all of the advertisement's links can be displayed over the image. Alternatively, for example, four screenshots in block format can display all of the ads in freeze-frame.

Mobile applications can be configured to work offline. In these instances, a process may be in place that allows the user to connect to the advertiser's designated contact telephone number when the link or connectivity to the Internet is limited or lost.

Instead of the text-only extraction and search engines that use word association alone to populate side bars, banner and other commonplace web-based adverts, embodiments of the systems and methods described herein may extract any article(s) from the Internet as long as the article has an image. The advertisement in the image can still be displayed. By doing this, even if a user reads content extracted or aggregated from another website, (or websites), the content, its image(s) and all associated advertisement URLs can follow.

For example, The New York Times™ online news source publishes an article about Banana Republic™ clothing store and includes an image of the clothing store. The article is about how the Banana Republic™ clothing store is losing money, etc. When The New York Times™ news source uploads the image of the clothing store, a URL will be associated with the image. A search engine like Google™ can reference the index of this page hosting the image. A user going to Google™ search engine and performing an image search for recent images using the term "Banana Republic" may find the picture uploaded by The New York Times™ news source but without the embedded article text.

However, this disclosure can preserve all of the advertisements, links, etc. by making the news companies into secondary advertisers. Only allowed indexed text from news websites can be extracted if the image(s) and embedded advertisements and links are found with the indexed text. In this way, news web sites can become secondary advertisers creating a new revenue channel.

Instead of an advertisement displaying a URL alone, a short voice or audio file can be uploaded by the primary advertiser explaining the website and/or tagged item(s) within the content. The electronic media originator (secondary advertiser) can also create and upload his/her own voice file to do the same. This file may be embedded, just as a URL is, and may play back upon a rollover or a click action. The user can enable or disable this setting.

In addition, the application can be configured so that advertisers creating a campaign will be able to insert or designate a call center number and upload an audio-based description of their business, product, service, etc. If a potential customer wants to use this service, (s) he clicks on the VOIP (e.g., Skype™) option in the toolbar at the top of the page. The audio-based description will play and the potential customer may be connected to either a live agent or the respective advertiser's interactive voice response unit (IVR) which will allow the user to navigate through predetermined options based on vocal commands and/or touchtone keypad entries. If the user selects this option and is unable to find his/her answer(s) through the IVR, he will have the option to connect to a live operator or leave a message.

Although the embodiments discussed above are implemented online, the image itself with the tags and associated URL can be stored offline. All offline content will have the embedded URL and designated contact information of the participating advertiser. Analytics technology such as that employed by Google™ Adwords™ or Facebook™ can track any/all information related to users and the embedded URL, respectively.

The system can be tailored for visually impaired users, hearing-impaired users and the like. Visually impaired users may have the option to listen to a video or audio associated with the advertisement in the content. If a visually impaired user is interested in knowing what advertisements are being displayed on any particular screen, he/she will have the option to use vocal prompt(s) and notification(s), (e.g., a video will pause and call out the tagged item(s)/area(s) within the frame). The potential customer may then have vocal response options that enable him/her to be directed to any particular advertisement by name or number. The advertisement may then vocally indicate if there are options, (e.g., "similar to" advertisements or "Direct Advert"). Various features or options may be available to the visually impaired through vocal response. Similarly, hearing-impaired users may have various features or options available to them through closed-captioning.

As another option, employees of film studios such as Warner Brothers™, 20th Century Fox™, and Paramount™ may have the option of "item tagging" a movie. The employees would then embed URL links and product descriptions on items that appear in a movie for the retail DVD release(s). Retail production DVDs, or online movie platforms such as Hulu™ or NetFlix™, would play movies that contain advertisements that are embedded throughout. If the viewer's cursor rollsover the movie being played it will pause with advertisements contained within the frame displayed. Likewise, a controller for the respective DVD/online playback device(s) will trigger the same sequence. A viewer (potential customer) can push a button and ask a question such as, "what shirt is Tom Cruise wearing in this scene", or "what hotel are they staying at in this scene", etc. The advertisement can either play the name through the remote, or open the URL on TV (contingent upon Internet-connectivity of the playback device). Devices that speak to each other through Bluetooth or Wi-Fi can link to one another and the results can be sent to the respective device(s) without interrupting the movie.

While specific embodiments have been described above, various alternatives, modifications and variations may become apparent to those skilled in the art. Accordingly, the exemplary embodiments as set forth above are considered to be illustrative and not limiting. Various changes to the described embodiments may be made without departing from the spirit and scope of the invention.

What is claimed is:

1. A network advertising system, comprising:
  a primary advertiser database that stores a list of primary advertisers willing to pay a secondary advertiser to (i) embed advertising content into electronic media to which access by a potential customer is controlled by the secondary advertiser, and (ii) make the electronic media with the embedded advertising content viewable by the potential customer in a manner that allows the potential customer to be exposed to an advertisement;
  a tagging unit that allows a secondary advertiser to embed the advertising content by tagging an item within the electronic media by indicating an area on or near the item, the tagging causing either or both of (i) a visual indicator and (ii) a tag label to be displayed on the electronic media, the tag label being text generated by the secondary advertiser;
  a text block unit that receives a search query from the secondary advertiser, retrieves primary advertiser information from the primary advertiser database in response to the search query and displays the primary advertiser information to the secondary advertiser, receives the secondary advertiser's selection of the primary advertiser information, and, after the item has been tagged by the secondary advertiser, associates the tagged item with a link of the primary advertiser in response to the selection of the primary advertiser information, wherein no advertisement other than the tag label or visual indicator is displayed with the electronic media, and wherein the link directs the potential customer to a specific site selected by the secondary advertiser;

a revenue-generating transaction database that records secondary advertising events for which the primary advertiser is willing to pay; and an accounting unit that tracks what is owed by the primary advertiser based on the events recorded by the revenue-generating transaction database.

2. The network advertising system of claim 1, wherein a primary advertiser terminal is permitted to perform one or more of the group consisting of (i) authenticating the embedded advertising content or associated link, (ii) removing the embedded advertising content or associated link from the electronic media and (iii) reporting the embedded advertising content or associated link to a coordinating system that manages the network advertising system.

3. The network advertising system of claim 1, wherein the network advertising system conveys to the secondary advertiser a higher incentive, compared to an initial incentive conveyed for associating a generic link of the primary advertiser, to find an exact page of relevance, receives a second search query from the secondary advertiser seeking to find a specific link corresponding to the exact page of relevance, retrieves search results and presents the search results to the secondary advertiser until the secondary advertiser finds and selects the specific link, and changes the associated link to the specific link selected by the secondary advertiser.

4. The network advertising system of claim 1, wherein the embedded advertising content is not visible in the electronic media by the potential customer until the potential customer has interacted with the tagged item.

5. The network advertising system of claim 1, wherein the secondary advertiser is an originator of the electronic media.

6. The network advertising system of claim 1, wherein image recognition software recognizes tagged items in the electronic media and searches other electronic media for a second item that is the same as the first tagged item, and the tagging unit causes the second item to be a second tagged item with the primary advertiser information of the first tagged item.

7. The network advertising system of claim 1, wherein, the electronic media is a video, and image recognition software tracks tagged items over multiple frames of the video.

8. The network advertising system of claim 7, wherein the network advertising system is configured to pause the video upon an interaction with the tagged item.

9. The network advertising system of claim 1, wherein the text block unit is configured to prompt the secondary advertiser to change the primary advertiser information when the accounting unit determines that an account balance of the primary advertiser falls below a predetermined level.

10. The network advertising system of claim 1, wherein, for receiving the secondary advertiser's selection of primary advertiser information, the text block unit presents to the secondary advertiser options to (i) automatically assign the primary advertiser information from the primary advertiser database, (ii) manually assign the primary advertiser information from the primary advertiser database and (iii) manually enter primary advertiser information that is not yet in the primary advertiser database, allowing the primary advertiser to subsequently join the primary advertiser database and activate the manually entered primary advertiser information.

11. The network advertising system of claim 1, wherein the primary advertiser has no control over its ranking order in search results returned by the text block unit.

12. The network advertising system of claim 1, wherein the visual indicator is (i) constantly visible on the electronic media or (ii) visible upon interaction with the tagged area by the potential customer.

13. The network advertising system of claim 1, wherein the secondary advertising events include one or more of the group consisting of (i) an indication that a potential customer has been exposed to the advertising content, (ii) an indication that the primary advertiser information has been displayed as a search result to the secondary advertiser, (iii) an indication that a potential customer has completed a purchase of a product based on the advertising content and (iv) an indication that the secondary advertiser has associated or maintained the association of an item with the advertising content.

14. The network advertising system of claim 1, wherein the tagging causes both of (i) the visual indicator and (ii) the tag label to be displayed on the electronic media.

15. A network advertising method, comprising:

maintaining a primary advertiser database that stores a list of primary advertisers willing to pay secondary advertisers to (i) embed advertising content into electronic media to which access by a potential customer is controlled by the secondary advertiser, and (ii) make the electronic media with the embedded advertising content viewable by the potential customers in a manner that allows the potential customer to be exposed to an advertisement;

receiving an indication that the secondary advertiser has embedded the advertising content by tagging an item within the electronic media by indicating an area on or near the item, the tagging causing either or both of (i) a visual indicator and (ii) a tag label to be displayed on the electronic media, the tag label being text generated by the secondary advertiser;

receiving a search query from the secondary advertiser, retrieving primary advertiser information from the primary advertiser database in response to the search query and displaying the primary advertiser information to the secondary advertiser, receiving the secondary advertiser's selection of the primary advertiser information, and, after the item has been tagged by the secondary advertiser, associating the tagged item with a link of the primary advertiser in response to the selection of the primary advertiser information, wherein no advertisement other than the tag label or visual indicator is displayed with the electronic media, and wherein the link directs the potential customer to a specific site selected by the secondary advertiser;

recording secondary advertising events for which the primary advertiser is willing to pay; and tracking what is owed by the primary advertiser based on the events recorded by the revenue-generating transaction database.

16. The method of claim 15, further comprising sending to a prospective primary advertiser, if the prospective primary advertiser is not in the primary advertiser database, an invitation to be added to the primary advertiser database.

17. The method of claim 15, further comprising
sending to the primary advertiser, if the primary advertiser is in the primary advertiser database, a request to review the association of the link; and
receiving from the primary advertiser, in response to the request, a reply that authenticates the association of the link, removes the association of the link or reports the association of the link to a coordinating system that manages the primary advertiser database.

18. The method of claim 15, wherein the tagged item is an image related to a product or service that is marketed by the primary advertiser.

19. The network advertising system of claim 1, wherein the tagged item is an image related to a product or service that is marketed by the primary advertiser.

20. The method of claim 15, further comprising conveying to the secondary advertiser a higher incentive, compared to an initial incentive conveyed for associating a generic link of the primary advertiser., to find an exact page of relevance, receiving a second search query from the secondary advertiser seeking to find a specific link corresponding to the exact page of relevance, retrieving search results and presenting the search results to the secondary advertiser until the secondary advertiser finds and selects the specific link, and changing the advertising content associated with the tagged item to correspond to the specific link selected by the secondary advertiser.

21. The method of claim 15, wherein the primary advertiser has no control over its ranking order in search results retrieved from the primary advertiser database.

22. The method of claim 15, wherein the visual indicator is (i) constantly visible on the electronic media or (ii) visible upon interaction with the tagged area by the potential customer.

23. The method of claim 15, wherein the secondary advertising events include one or more of the group consisting of (i) an indication that a potential customer has been exposed to the advertising content, (ii) an indication that the primary advertiser information has been displayed as a search result to the secondary advertiser (iii) an indication that a potential customer has completed a purchase of a product based on the advertising content and (iv) an indication that a secondary advertiser has associated or maintained an association of the tagged item with the advertising content.

24. The method of claim 15, wherein the tagging causes both of (i) the visual indicator and (ii) the tag label to be displayed on the electronic media.

* * * * *